(12) United States Patent
Kita

(10) Patent No.: US 9,091,952 B2
(45) Date of Patent: Jul. 28, 2015

(54) COLOR IMAGE FORMING APPARATUS, AND IMAGE FORMING CONDITION SETTING METHOD FOR COLOR IMAGE FORMING APPARATUS

(75) Inventor: Hiroshi Kita, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 1268 days.

(21) Appl. No.: 12/418,406

(22) Filed: Apr. 3, 2009

(65) Prior Publication Data

US 2009/0251715 A1 Oct. 8, 2009

(30) Foreign Application Priority Data

Apr. 4, 2008 (JP) .................................. 2008-098272

(51) Int. Cl.
| | |
|---|---|
| H04N 1/46 | (2006.01) |
| G03F 3/08 | (2006.01) |
| G03G 15/01 | (2006.01) |
| H04N 1/60 | (2006.01) |
| G03G 15/00 | (2006.01) |
| H04N 1/407 | (2006.01) |

(52) U.S. Cl.
CPC ............ *G03G 15/01* (2013.01); *G03G 15/5062* (2013.01); *H04N 1/60* (2013.01); *H04N 1/6033* (2013.01); *H04N 1/6044* (2013.01); *H04N 1/6097* (2013.01); *G03G 2215/00067* (2013.01); *G03G 2215/00447* (2013.01); *G03G 2215/0132* (2013.01); *G03G 2215/0164* (2013.01); *H04N 1/407* (2013.01); *H04N 1/6022* (2013.01)

(58) Field of Classification Search
USPC ........................................................ 358/1.13
See application file for complete search history.

(56) References Cited

U.S. PATENT DOCUMENTS

| | | | | |
|---|---|---|---|---|
| 5,649,073 | A | * | 7/1997 | Knox et al. ..................... 358/1.9 |
| 6,484,631 | B2 | * | 11/2002 | Degani et al. ................. 101/171 |
| 6,603,566 | B1 | * | 8/2003 | Shono .......................... 358/1.13 |
| 7,027,182 | B1 | * | 4/2006 | Soler .............................. 358/1.9 |
| 7,097,270 | B2 | | 8/2006 | Yamazaki |
| 7,177,558 | B2 | | 2/2007 | Tanaka |
| 7,203,434 | B2 | | 4/2007 | Nakayama |
| 2002/0085235 | A1 | * | 7/2002 | Degani et al. ................. 358/3.06 |
| 2002/0113984 | A1 | * | 8/2002 | Nakajima et al. .............. 358/1.9 |
| 2003/0085941 | A1 | | 5/2003 | Tezuka et al. |
| 2004/0150858 | A1 | * | 8/2004 | Cholewo et al. ............. 358/3.06 |
| 2004/0212816 | A1 | * | 10/2004 | Tanabe et al. .................. 358/1.9 |
| 2005/0088710 | A1 | * | 4/2005 | Nakayama ..................... 358/518 |
| 2005/0117926 | A1 | | 6/2005 | Tanaka et al. |
| 2005/0117927 | A1 | | 6/2005 | Tanaka et al. |

(Continued)

FOREIGN PATENT DOCUMENTS

| | | | |
|---|---|---|---|
| JP | 2003-107830 A | | 4/2003 |
| JP | 2004069947 A | | 3/2004 |

(Continued)

*Primary Examiner* — King Poon
*Assistant Examiner* — Vincent Peren
(74) *Attorney, Agent, or Firm* — Canon USA, Inc., IP Division

(57) ABSTRACT

Specification of a printing mode or medium is identified, and gray axis correction control is performed based on the identified printing mode or medium. Subsequently, determination is made regarding whether or not to predict a value equivalent to the results of the gray axis correction control, for a different printing mode or medium, based on the results. If certain conditions are satisfied, the results of prediction are taken as the results of the gray axis correction control for the different printing mode.

14 Claims, 27 Drawing Sheets

(56) References Cited

U.S. PATENT DOCUMENTS

| | | | |
|---|---|---|---|
| 2005/0243342 A1* | 11/2005 | Abramsohn | 358/1.9 |
| 2006/0023272 A1* | 2/2006 | Tezuka | 358/518 |
| 2007/0177231 A1* | 8/2007 | Wang et al. | 358/504 |
| 2007/0285695 A1* | 12/2007 | Hains et al. | 358/1.9 |
| 2008/0218779 A1* | 9/2008 | Shirasawa | 358/1.9 |
| 2010/0067059 A1* | 3/2010 | Sivan et al. | 358/3.06 |

FOREIGN PATENT DOCUMENTS

| | | |
|---|---|---|
| JP | 2005-125714 A | 5/2005 |
| JP | 2005-167550 A | 6/2005 |
| JP | 2006018180 A | 1/2006 |
| JP | 2006030793 A | 2/2006 |
| JP | 2007-163802 A | 6/2007 |

* cited by examiner

FIG. 7

| | PATCH NO. | C GRADATION VALUE | M GRADATION VALUE | Y GRADATION VALUE | K GRADATION VALUE |
|---|---|---|---|---|---|
| FIRST SET | (1) | C00 (=C0−α) | M00 (=M0) | Y00 (=Y0) | 0 |
| | (2) | C01 (=C0+α) | M01 (=M0) | Y01 (=Y0) | 0 |
| | (3) | C02 (=C0) | M02 (=M0−α) | Y02 (=Y0) | 0 |
| | (4) | C03 (=C0) | M03 (=M0+α) | Y03 (=Y0) | 0 |
| | (5) | C04 (=C0) | M04 (=M0) | Y04 (=Y0−α) | 0 |
| | (6) | C05 (=C0) | M05 (=M0) | Y05 (=Y0+α) | 0 |
| | (7) | 0 | 0 | 0 | K0 |
| SECOND SET | (1) | C10 | M10 | Y10 | 0 |
| | (2) | C11 | M11 | Y11 | 0 |
| | (3) | C12 | M12 | Y12 | 0 |
| | (4) | C13 | M13 | Y13 | 0 |
| | (5) | C14 | M14 | Y14 | 0 |
| | (6) | C15 | M15 | Y15 | 0 |
| | (7) | 0 | 0 | 0 | K1 |
| THIRD SET | (1) | C20 | M20 | Y20 | 0 |
| | (2) | C21 | M21 | Y21 | 0 |
| | (3) | C22 | M22 | Y22 | 0 |
| | (4) | C23 | M23 | Y23 | 0 |
| | (5) | C24 | M24 | Y24 | 0 |
| | (6) | C25 | M25 | Y25 | 0 |
| | (7) | 0 | 0 | 0 | K2 |

FIG. 9

| PATCH NO. | EXPLANATORY VARIATE C | EXPLANATORY VARIATE M | EXPLANATORY VARIATE Y | CRITERION VARIATE a* |
|---|---|---|---|---|
| (1) | C00 | M00 | Y00 | a00 |
| (2) | C01 | M01 | Y01 | a01 |
| (3) | C02 | M02 | Y02 | a02 |
| (4) | C03 | M03 | Y03 | a03 |
| (5) | C04 | M04 | Y04 | a04 |
| (6) | C05 | M05 | Y05 | a05 |

FIG. 19A

| TYPE | CORRESPONDING PRINT MODE |
|---|---|
| TYPE A | PLAIN PAPER, THIN PAPER |
| TYPE B | GLOSSY PAPER, THICK PAPER |

FIG. 19B

| TYPE A | C GRADATION VALUE | M GRADATION VALUE | Y GRADATION VALUE |
|---|---|---|---|
| CORRECTED FIRST GRADATION VALUE | C0_A | M0_A | Y0_A |
| CORRECTED SECOND GRADATION VALUE | C1_A | M1_A | Y1_A |
| CORRECTED THIRD GRADATION VALUE | C2_A | M2_A | Y2_A |
| CORRECTED FOURTH GRADATION VALUE | C3_A | M3_A | Y3_A |
| CORRECTED FIFTH GRADATION VALUE | C4_A | M4_A | Y4_A |
| CORRECTED SIXTH GRADATION VALUE | C5_A | M5_A | Y5_A |
| CORRECTED SEVENTH GRADATION VALUE | C6_A | M6_A | Y6_A |
| CORRECTED EIGHTH GRADATION VALUE | C7_A | M7_A | Y7_A |

FIG. 19C

| TYPE B | C GRADATION VALUE | M GRADATION VALUE | Y GRADATION VALUE |
|---|---|---|---|
| CORRECTED FIRST GRADATION VALUE | C0_B | M0_B | Y0_B |
| CORRECTED SECOND GRADATION VALUE | C1_B | M1_B | Y1_B |
| CORRECTED THIRD GRADATION VALUE | C2_B | M2_B | Y2_B |
| CORRECTED FOURTH GRADATION VALUE | C3_B | M3_B | Y3_B |
| CORRECTED FIFTH GRADATION VALUE | C4_B | M4_B | Y4_B |
| CORRECTED SIXTH GRADATION VALUE | C5_B | M5_B | Y5_B |
| CORRECTED SEVENTH GRADATION VALUE | C6_B | M6_B | Y6_B |
| CORRECTED EIGHTH GRADATION VALUE | C7_B | M7_B | Y7_B |

FIG. 21

| NO. | CONDITION |
|---|---|
| 1 | GRAY AXIS CORRECTION CONTROL NEVER PERFORMED EVEN ONCE |
| 2 | PREDETERMINED AMOUNT OF TIME ELAPSED SINCE GRAY AXIS CORRECTION CONTROL WAS PERFORMED IN PAST |
| 3 | PARTS OF IMAGE FORMING APPARATUS HAVE BEEN REPLACED SINCE GRAY AXIS CORRECTION CONTROL WAS PERFORMED IN PAST |

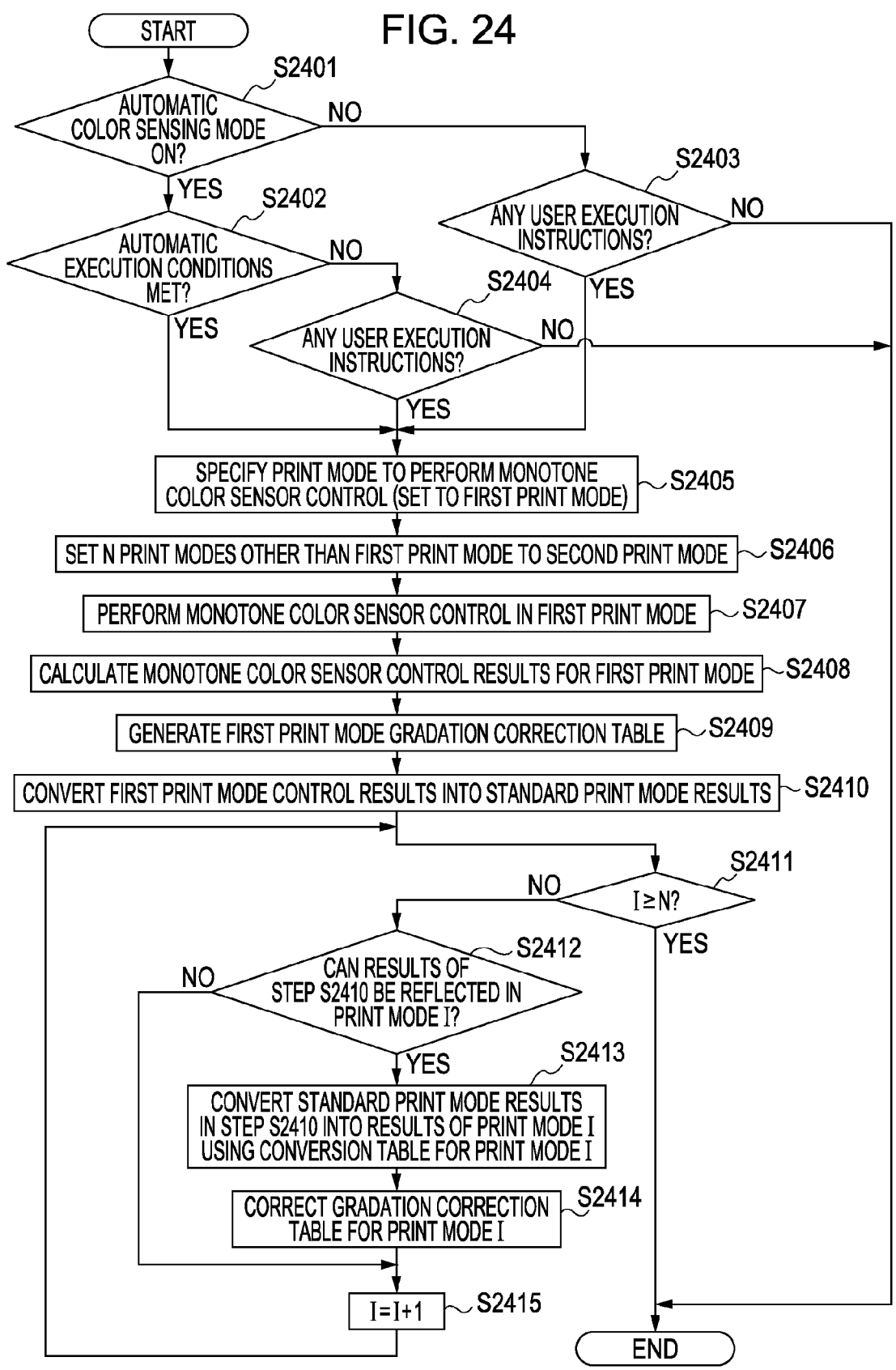

FIG. 25A

| NO. | CONDITIONS ALLOWING REFLECTING OF OTHER PRINT MODE RESULTS |
|---|---|
| 1 | MONOTONE COLOR SENSOR CONTROL HAS NEVER BEEN PERFORMED IN THE PAST |
| 2 | CASE WHERE THE STATE OF THE IMAGE FORMING APPARATUS HAS CHANGED FROM PAST MONOTONE COLOR SENSOR CONTROL |

FIG. 25B

| NO. | CONDITIONS FOR DETERMINING THAT THE STATE OF THE IMAGE FORMING APPARATUS HAS CHANGED |
|---|---|
| 2-1 | CASE WHERE THE AMOUNT OF CHANGE IN AT LEAST ONE OF TEMPERATURE AND HUMIDITY DETECTION VALUES HAS EXCEEDED A PREDETERMINED VALUE |
| 2-2 | CASE WHERE ANY ONE OF NUMBER OF SHEETS PRINTED, USAGE OF CONSUMABLES, AND PASSAGE OF TIME, HAS EXCEEDED A PREDETERMINED THRESHOLD VALUE |
| 2-3 | CASE WHERE RECORDING SHEET OR TRANSFER MEMBER RESISTANCE DETECTION RESULT HAS EXCEEDED A PREDETERMINED THRESHOLD VALUE |
| 2-4 | CASE WHERE REPLACEMENT OF PARTS HAS BEEN DETECTED |
| 2-5 | CASE WHERE AMOUNT OF CHANGE OF DENSITY SENSOR OR COLOR SENSOR DETECTION VALUE HAS EXCEEDED A PREDETERMINED THRESHOLD VALUE |

FIG. 26A

IMAGE FORMING APPARATUS DIFFERENCE DATABASE BETWEEN PRESENT AND LAST CONTROL TIME, FOR EACH PRINT MODE

| PRINT MODE | TIME ELAPSED (h) | TEMPERATURE (°C) | HUMIDITY (%) | NUMBER PRINTED (SHEETS) | USAGE OF CONSUMABLES (%) | CHANGE IN SHEET RESISTANCE (%) | CHANGE IN TRANSFER MEMBER RESISTANCE (%) | PART REPLACEMENT | PATCH DETECTION RESULT (ΔE) | REFLECTING OF RESULTS OF OTHER MODES |
|---|---|---|---|---|---|---|---|---|---|---|
| PRINT MODE 1 | CURRENTLY PERFORMING MONOTONE COLOR SENSOR CONTROL | | | | | | | | | |
| PRINT MODE 2 | 36 | −7 | −5 | 1650 | 15 | +10 | 15 | YES | 8.5 | ○ |
| PRINT MODE 3 | 16 | +3 | 0 | 750 | 12 | −1 | 5 | NO | 3.0 | × |
| ... | | | | | | | | | | |

FIG. 26B

THRESHOLD VALUES FOR DETERMINATION OF MONOTONE COLOR SENSOR CONTROL

| TIME ELAPSED (h) | 18 |
|---|---|
| TEMPERATURE (°C) | ±10°C OR GREATER |
| HUMIDITY (%) | ±10% OR GREATER |
| NUMBER PRINTED (SHEETS) | 2000 SHEETS OR MORE |
| USAGE OF CONSUMABLES (%) | 18% OR GREATER |
| CHANGE IN SHEET RESISTANCE (%) | ±5% OR GREATER |
| CHANGE IN TRANSFER MEMBER RESISTANCE (%) | 18% OR GREATER |
| PART REPLACEMENT | YES |
| PATCH DETECTION RESULT (ΔE) | 4.0 OR MORE |

COLOR IMAGE FORMING APPARATUS, AND IMAGE FORMING CONDITION SETTING METHOD FOR COLOR IMAGE FORMING APPARATUS

BACKGROUND OF THE INVENTION

1. Field of the Invention

The present invention relates to a color image forming apparatus configured to form a color image based on image signals, and specifically, relates to a setting technique of an image forming condition thereof.

2. Description of the Related Art

Previously, in e.g. Japanese Patent Application Laid-Open No. 2003-107830, there has been proposed a technique for employing a sensor (color sensor) which detects the color information of a color image after fixing so that a proportion between cyan, magenta, and yellow can be obtained such that process gray becomes an achromatic color or generally achromatic color, thereby achieving gray balance (hereafter, gray axis correction control).

Also, with Japanese Patent Application Laid-Open No. 2005-125714, there has been proposed a technique for executing the above-mentioned gray axis correction control for each type of recording material regarding surface property, saving the execution results thereof, and thereafter, employing the saved execution results at the time of print execution of the corresponding type of recording material. Further, according to Japanese Patent Application Laid-Open No. 2005-125714, there has also been proposed a technique for improving usability such that the execution results of the above-mentioned gray axis correction control are saved regarding the type of recording material which a user desires in accordance with the user's instructions. Note that, in general, the type of recording material also corresponds to the type of print mode, so let us say that the difference between the types of media can be interpreted as the difference between types of print modes.

Also, Japanese Patent Application Laid-Open No. 2005-167550 has proposed a color sensing technique wherein a patch is formed on a recording material serving as a basic type, an image forming condition is set regarding the type of recording material employed for a subsequent job based on the detection result of the patch. Note that this color sensing technique differs from the above-mentioned gray axis correction control. Further, Japanese Patent Application Laid-Open No. 2005-167550 has proposed a technique for forming a patch on all types of recording materials in the image forming apparatus when there is no job reservation, and setting an image forming condition regarding all types of recording material based on the detection results of these patches.

However, with Japanese Patent Application Laid-Open No. 2005-125714, the chromaticity or glossiness is detected regarding a certain type of recording material, and the gray axis correction control is executed, but in the following, the actual value is not updated until a gray axis correction control execution instruction regarding the type of recording material thereof is received. That is to say, usage of consumables, and change in control bias since the gray axis correction control has been performed regarding the same recording material in the past are not taken into consideration. In other words, there has been a case where it is difficult to follow change in image forming conditions (e.g., density/gradation property) due to fluctuation such as toner charge amount and particle sizes due to change in the usage of consumables, difference of transfer selection bias at the time of performing control, or the like. As a result thereof, in order to handle each recording material having multiple types of surface property (corresponding to each print mode), there is room for improvement in printing image quality.

Also, with Japanese Patent Application Laid-Open No. 2005-167550, each time a job of the user's desired media type is input, a patch is formed on a recording material having a basic type, and color sensing is performed. This case includes a problem wherein productivity deteriorates when attempting to obtain excellent image quality overall in order to handle each recording material having multiple types of surface property.

On the other hand, with Japanese Patent Application Laid-Open No. 2005-167550, color sensing is performed for all recording materials at the time of a printer standby (non-printing) state, but this causes a problem wherein significant downtime may occur as to a print execution instruction given by the user at an arbitrary time, in some cases. Also, at this time, there is also a problem wherein a great number of consumables including recording materials are consumed.

To this end, there has been demand for improved printing image quality overall in multiple types of print modes while reducing both downtime and consumption of consumables.

SUMMARY OF THE INVENTION

An image forming apparatus, configured to perform print processing corresponding to each of at least three print modes, includes: a forming unit configured to form a patch on a recording material in one of the at least three print modes; a detector configured to detect the patch formed on the recording material before the recording material is ejected and stacked; and a setting unit configured to set an image forming condition for the one of the at least three print modes based on a detection result by the detector; wherein the setting unit is further configured to set an image forming condition for at least two of the at least three print modes, other than the one of the at least three print modes, based on the detection result of the patch formed on the recording material in the one of the at least three print modes by the detector.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 7 is a diagram illustrating an example of a test image employed for the gray axis correction control.

FIG. 9 is a diagram illustrating an example of a data set employed for multiple-regression calculation of the gray axis correction control.

FIGS. 19A through 19C are diagrams illustrating corrected C, M and Y gradation values for two types of print mode.

FIG. 21 is a diagram illustrating an example of determination conditions in the flowchart shown in FIG. 20.

FIG. 24 is a flowchart illustrating processing for reflecting the monochrome color sensor control results of a certain print mode on the control results of another print mode.

FIGS. 25A and 25B are diagrams illustrating examples of determination conditions in the flowchart shown in FIG. 24.

FIGS. 26A and 26B are diagrams illustrating a print mode management table and the determination condition thresholds in FIG. 24.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Description will be made below regarding an image forming apparatus for performing optimal print processing corresponding to each of a plurality of three or more print mode types (corresponding to a recording material type), and the achievement of excellent print image quality overall while suppressing or reducing both downtime and consumption of consumables.

A first exemplary embodiment will be described with reference to the appended drawings.

<Overall Configuration Diagram of Color Image Forming Apparatus>

Figure 1:
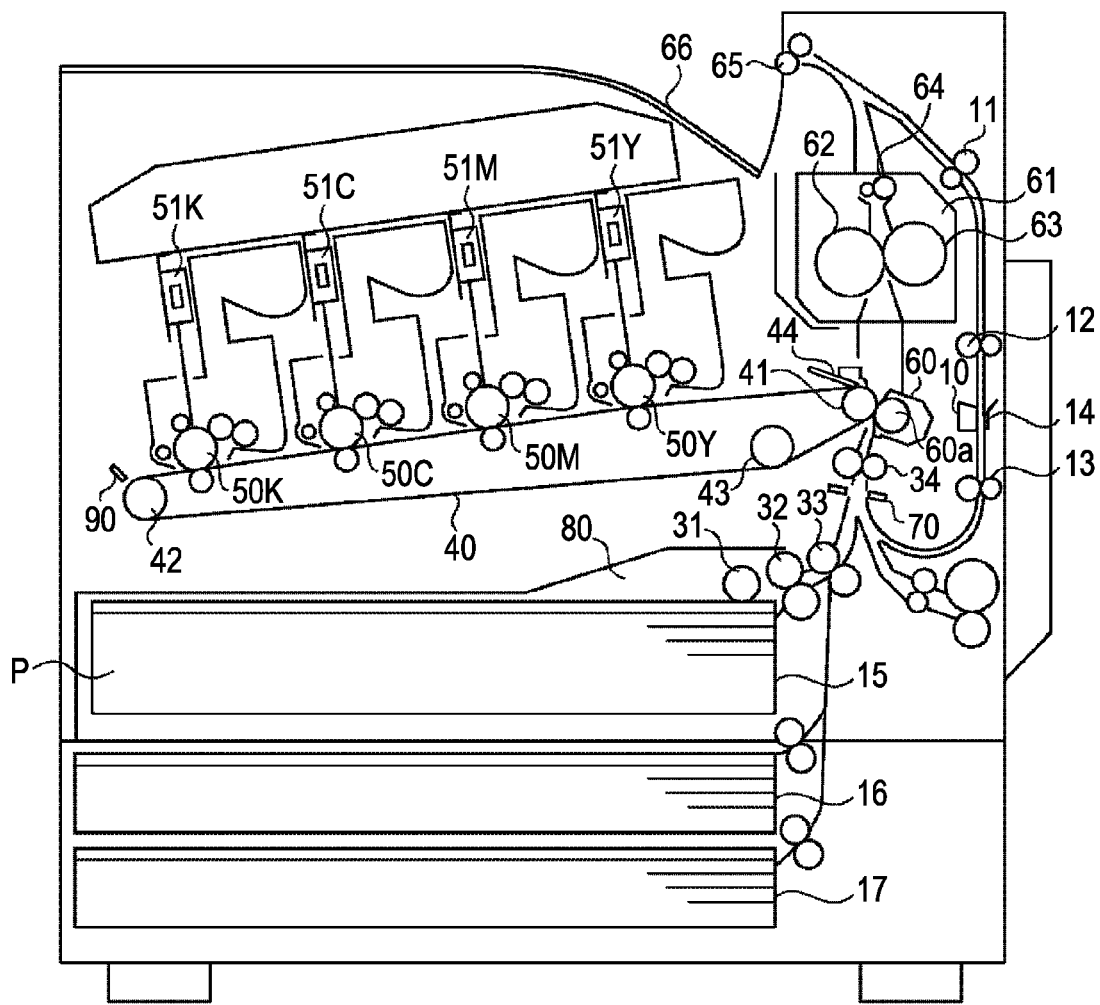
FIG. 1 is a diagram illustrating the cross-section of a color image forming apparatus.

FIG. 1 is an example of a cross-sectional view illustrating the overall configuration of a color image forming apparatus. This apparatus is an example of an electrophotographic-type color image forming apparatus, and is also a tandem-type color image forming apparatus employing an intermediate transfer belt.

An image signal is transmitted to an image data input unit from a host PC or operation panel directly connected or network-connected to the color image forming apparatus according to the present embodiment through a printer controller. Reference numerals 50Y, 50M, 50C, and 50K denote photosensitive drums, and are provided in the respective image forming stations including the respective color developing materials (toner) of yellow, magenta, cyan, and black, respectively. A laser is exposed on the surface of each photosensitive drum 50Y, 50M, 50C, and 50K from each of laser scanner devices 51Y, 51M, 51C, and 51K corresponding to the respective colors based on the image data transmitted from an image forming apparatus control unit, thereby forming a latent image. On the surface of each photosensitive drums 50Y, 50M, 50C, and 50K where a latent image is formed, a toner image developed by the developing materials of yellow, magenta, cyan, and black is formed. Reference numeral 40 denotes an intermediate transfer belt, which is laid firmly by a driving roller 41, tension roller 42, and follower roller 43. The toner image of each color formed at each of the photosensitive drums 50Y, 50M, 50C, and 50K is primary-transferred on the intermediate transfer belt 40. Also, reference numeral 80 denotes paper feed trays having a three-stage configuration, and recording materials P15, 16, and 17, which are recording materials, are stacked in the respective trays. There is a case where a print mode (recording material type) has been set to each of the paper feed trays beforehand, and in this case, a print mode is determined in each step in a later-described flowchart in accordance with the print mode (recording material type) set to the paper feed tray specified in a print instruction.

The color image forming apparatus in FIG. 1 has multiple print modes and handles printing of thin paper, thick paper, and glossy paper of which the basis weight and surface property differ, as well as plain paper, and the type of recording material corresponding to each print mode is loaded in each of the paper feed trays. Here, the above-mentioned "basis weight" represents the weight of recording material per unit area, and is generally represented with $g/m^2$ in many cases, and the color image forming apparatus in FIG. 1 handles recording material with basis weight of 64 $g/m^2$ through 220 $g/m^2$. Also, with regard to the present embodiment, the term "surface property" means the unevenness level of the uppermost layer of recording materials. In general, in the case of glossy paper, a resin layer is coated on a base material, whereby the surface thereof is smoothed. Also, with plain paper as well, there are various surface properties depending on the difference of base material, from great unevenness caused by base material fibers emerging on the surface, to evenness wherein base material fibers are aligned in a certain direction.

Recording materials P are fed by a paper feed roller 31, conveyed by a feed retard roller pair 32, and conveying roller pair 33, and are conveyed to a register roller pair 34. At this time, the recording material P is temporarily stopped at the register roller pair 34, where a recording material sensor 70 measures the optical reflectance ratio of a predetermined position on the recording material. Subsequently, based on the result thereof, the image forming apparatus control unit automatically selects the optimal print mode by identifying the type of the recording material P. Note that the print mode (corresponding to the type of the recording material P) may be set manually from a printer driver setting screen (not shown) which the user can operate on an operation panel attached to the image forming apparatus, or on a PC screen other than the automatic selection setting by the recording material sensor 70.

Subsequently, after the inclination of the recording material P is corrected by the register roller pair 34, the recording material P is conveyed to a secondary transfer unit 60 at predetermined timing, where a toner image on the intermediate transfer belt 40 is transferred thereupon. The toner subsequently remaining on the intermediate transfer belt 40 is removed by a cleaning unit 44. The recording material P is conveyed to a fixer 61 by a secondary transfer roller 60a of the secondary transfer unit 60, and the intermediate transfer belt 40. At the fixer 61, the recording material P is held between a fixing roller 62 and a pressure roller 63, and fixing of a toner image on the recording material P is performed. The recording material P passed through the fixer 61 is conveyed to a fixing ejection roller pair 64, and an ejection roller pair 65, and is ejected from the color image forming apparatus and deposited or stacked onto an ejection tray 66. Note that in a case where a duplex print command is received from a printer controller, the conveying direction of the recording material P is inverted at the ejection roller pair 65, and the recording material P is conveyed to conveying roller pairs 11, 12, and 13, and is conveyed again to the register roller pair 34 of which the driving has been stopped.

<Density Sensor 90>

Figure 3A:
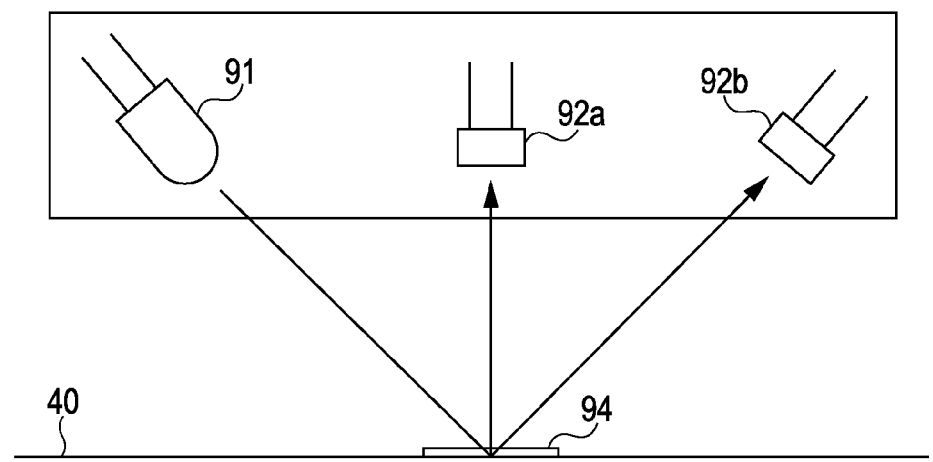
FIGS. 3A and 3B are diagrams illustrating an example of the configuration of a density sensor and color sensor.

Next, description will be made with regard to density sensor 90. The density sensor 90 is disposed facing the intermediate transfer belt 40 in the image forming apparatus in FIG. 1, and measures the density of a toner patch (94) serving as a test image formed on the surface of the intermediate transfer belt 40. An example of the configuration of a density sensor 90 is shown in FIG. 3A. The density sensor 90 in FIG. 3A is configured of an infrared light emitting element 91 such as an LED or the like, light receiving elements 92a and 92b such as a photodiode, Cds, or the like, and a holder (not shown) which accommodates these, an integrated circuit (IC) for processing received optical data (not shown), and so forth. A light receiving element 92a detects irregular reflected light intensity from the toner patch, and a light receiving element 92b detects regular reflected light intensity from the toner patch. Both of the irregular reflected light intensity and regular reflected light intensity are detected, whereby the density of the toner patch from high density to low density can be detected. The density sensor 90 cannot identify the color of the toner mounted on the intermediate transfer belt 40 and therefore a gradation patch 94 of monochrome toner is formed on the intermediate transfer belt 40. Subsequently, this density data is fed back to a density correction table for correcting the gradation/density property of an image processing unit, and image forming conditions such as each process condition of an image forming unit.

<Color Sensor 10>

Next, description will be made regarding a color sensor 10. In FIG. 1, the color sensor 10 is disposed between the conveying roller pair 12 and 13 within a duplex conveying route, downstream from the fixer 61 on a recording material conveying route. Subsequently, a monochrome patch or the color of a mixed color patch, formed and fixed on the recording material P is detected while conveying the recording material P under the control of the density/gradation control unit 308. Subsequently, an L*a*b* value corresponding to each patch is output through an RGB pair L*a*b* chromaticity conversion table (not shown). This color sensor 10 is disposed within the color image forming apparatus, whereby an image after fixing can be detected automatically before being ejected from the image forming apparatus by an ejecting unit, and deposited or stacked onto e.g. an ejection tray.

In a case where the color on the recording material P is actually detected by the color sensor 10, a color detection operation command is output from the image forming apparatus control unit, the facing plate 14 is brought towards color sensor 10, the facing plate being subjected to a light pressure by driving source (not shown). Here, the reason why facing plate 14 is brought, under light pressure, towards the color sensor 10 u is to both suppress instability of the recording material P, under conveyance between the facing plate 14 and color sensor 10, thereby providing a reliably constant distance between the color sensor 10 and recording material P, and to perform color detection with precision.

Figure 3B:
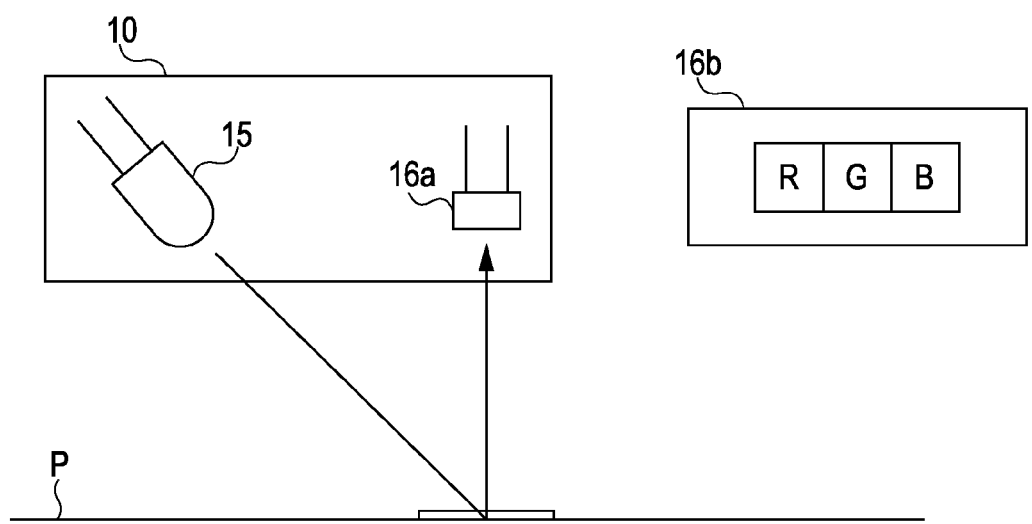

FIG. 3B illustrates the cross-section of the color sensor 10. The color sensor 10 employs a white LED 15 serving as a light emitting element, and a charge-storage-type sensor 16a with an on-chip filter which is three colors or more such as RGB or the like, as a light receiving element. The white LED 15 is input diagonally 45° to the recording material P where the test image is formed and has been fixed, and the irregular reflected light intensity in the 0-degree direction is detected by the RGB charge-storage-type sensor 16a with an on-chip filter. The light receiving unit of the RGB charge-storage-type sensor 16a with an on-chip filter is configured of pixels of which the RGB are independent such as shown in reference numeral 16b. The light receiving element may be a photodiode, the light receiving element may have multiple sets of three aligned RGB pixels, the light emitting element may be configured to emit light at the incident angle of 0 degrees and the light receiving element may be positioned to detect reflected light at the reflection angle of 45 degrees, the light emitting element may be configured with an LED for emitting three colors or more such as RGB, or the like and an unfiltered sensor, or the color sensor may be configured with a spectrophotometer with a white light source such as a halogen lamp or the like as a light emitting unit and with a spectroscope as a light receiving unit.

<Functional Block Diagram of Image Forming Apparatus>

Figure 2:
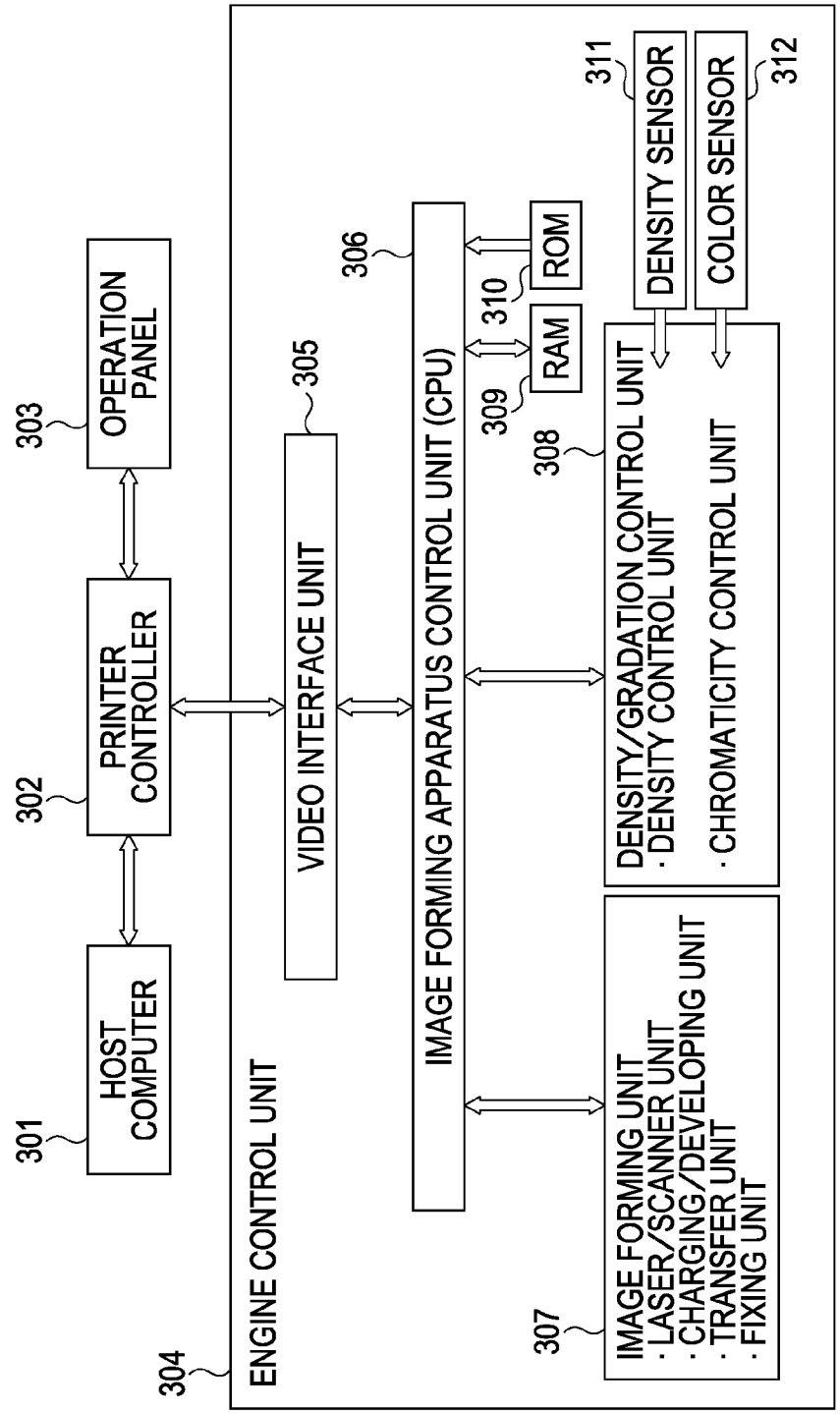
FIG. 2 is a diagram illustrating functional blocks of the color image forming apparatus.

FIG. 2 is a functional block diagram for describing the system configuration of the image forming apparatus. A printer controller 302 can perform communication with a host computer 301 or operation panel 303, and an engine control unit 304. The printer controller 302 receives normal print image information and commands, or density/gradation property control image information (as described below) and commands from the host computer 301 or operation panel 303. Subsequently, the printer controller 302 analyzes the received image information to convert the received image information into bit data, and transmits a print reservation command, print start command, and video signals to the engine control unit 304 for each recording material through a video interface unit 305.

Also, the printer controller 302 transmits print instruction information to the engine control unit 304 when starting printing. Also, in a case where the transmitted information is modified, the printer controller 302 transmits new information to the engine control unit 304 again. The print instruction information includes information indicating simplex print or duplex print, information indicating full color mode or monochrome mode, and recording material type information such as plain paper, glossy paper, thick paper, or the like (equivalent to print mode information), paper feed cassette information for feeding recording material, recording material size such as letter, A3, A4, or the like, and information indicating a normal print execution instruction or density/gradation property control execution instruction.

Subsequently, the printer controller 302 transmits the print reservation command to the engine control unit 304 in accordance with the print command from the host computer 301, and transmits a print start command to the engine control unit 304 once a printable-state is reached. The engine control unit 304 starts a print operation after receiving the print start command from the printer controller 302. Specifically, an image forming apparatus control unit 306 (hereafter, sometimes referred to as "control unit 306") controls an image forming unit 307 based on the information received from the printer controller 302 through the video interface unit 305, and completes the specified print operation. Also, in a case where the density/gradation property control has been specified, the control unit 306 controls the density/gradation control unit 308 including a density control unit for controlling a density sensor 90, and a chromaticity control unit for controlling a color sensor 10. Further, at the time of the above-mentioned print operation or density/gradation property control, the control unit 306 refers and updates RAM 309 or ROM 310. The RAM 309 stores, for example, density/gradation control results, and the ROM 310 stores the setting values of the image forming unit 307 for each print mode.

Note that in FIG. 2, the density/gradation control unit 308 is described separately from the control unit 306, but the density/gradation control unit 308 may be embedded in the control unit 306. Subsequently, all or part of the processing by the density/gradation control unit 308 described below may be performed by the control unit 306. Also, conversely, the whole or a portion of the processing by the control unit 306 may be performed by the density/gradation control unit 308.

<Correction Control of Gradation/Density Property>

Figure 4:
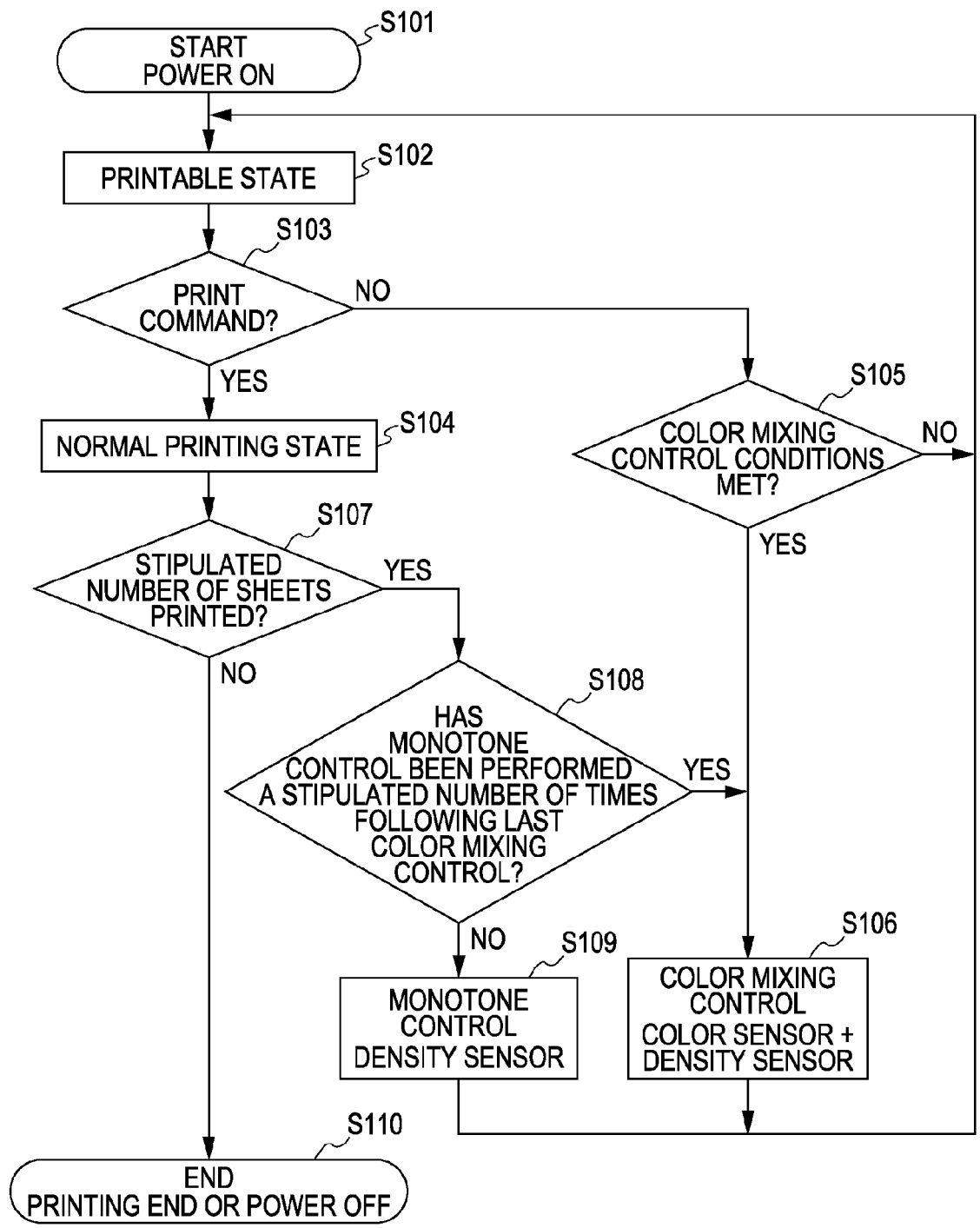
FIG. 4 is a flowchart illustrating control of gradation/density property combining the color sensor and density sensor.

Next, the concept of the gradation/density property control employing those sensors will be described. FIG. 4 is a flowchart illustrating the control of gradation/density property wherein the color sensor 10 and density sensor 90 are combined. The control employing the color sensor 10 uses recording materials, so the number of execution times is restricted as compared to the control employing the density sensor. Therefore, the gradation/density property control employing the color sensor 10 and density sensor 90 (hereafter, referred to as "mixed color control"), and the gradation/density property control employing only a density sensor with an unfixed patch (in other words a patch formed on the intermediate transfer belt 40) as an object (hereafter, referred to as "monochrome density control") are combined, whereby the number of control execution times according to color stabilization is reduced. Let us say that the processing in each step of the flowchart shown in FIG. 4 is executed by the control unit 306 in FIG. 2. Description of each step will be made below.

First, after power on in step S101, in step S102 the control unit 306 waits until a printable state is reached by the image processing apparatus i.e. until the image processing apparatus is ready to print, and in a case where a print command has not been received (NO in step S103), determines whether or not mixed color control execution conditions have been satisfied in step S105. The mixed color control execution conditions include, for example, a case where a cartridge has been replaced, a case where current environmental conditions have fluctuated significantly from previous environmental conditions, and a case where a part such as an intermediate transfer belt 40 or the like has been replaced which influences the image quality of a print sample. Note that, with regard to part replacement, the image forming apparatus may include a part replacement detecting unit (not shown). In a case where one of the above-mentioned conditions is satisfied (YES in step S105), in step S106 the control unit 306 performs the mixed color control employing the density sensor 90 and color sensor 10, and returns to step S102.

On the other hand, in a case where a print command has been received in step S103, the control unit 306 proceeds to a normal print state (step S104). In step S107, the control unit 306 determines whether or not the operating/use state of the color image forming apparatus is in a state in which a stipulated number of sheets has been printed. Note that, with the color image forming apparatus according to the present embodiment, the stipulated number of sheets is changed according to the rotation time of the developer or photosensitive drum. In a case where the number of stipulated sheets has already been printed at the time of normal printing (YES in step S107), in step S108 the control unit 306 determines whether or not the monochrome density control (referred to as monotone control in S108) has been performed the stipulated number of times since the last mixed color control was performed. Here, in a case where the monochrome density control has been performed fewer than the stipulated number of times (NO in step S108), the control unit 306 performs only the monochrome density control (referred to as monotone control in S109) employing the density sensor (90) alone (step S109). Also, in a case where the determination is made that the monochrome density control has been performed the stipulated number of times, but the reliability of the previous mixed color control results has deteriorated (YES in step S180), in step S106 the control unit 306 executes the mixed color control again. Note that execution of the mixed color or monochrome density control may be instructed manually by the user in a case where the user desires execution of the control.

<Mixed Color Control And Monochrome Density Control (According to Unfixed Patch Detection)>

Figure 5A:
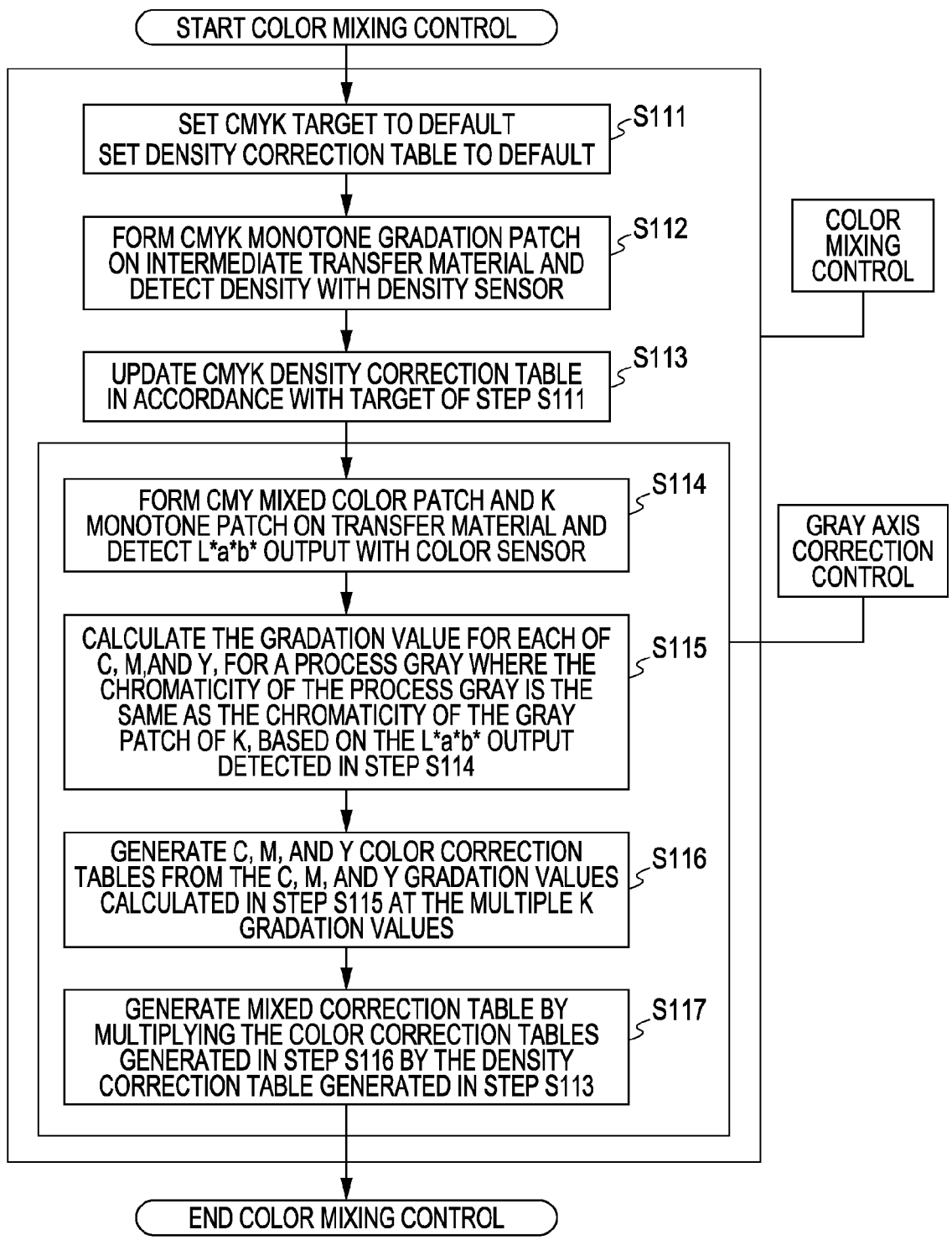
FIG. 5A is a flowchart illustrating details of mixed color control.
Figure 5B:
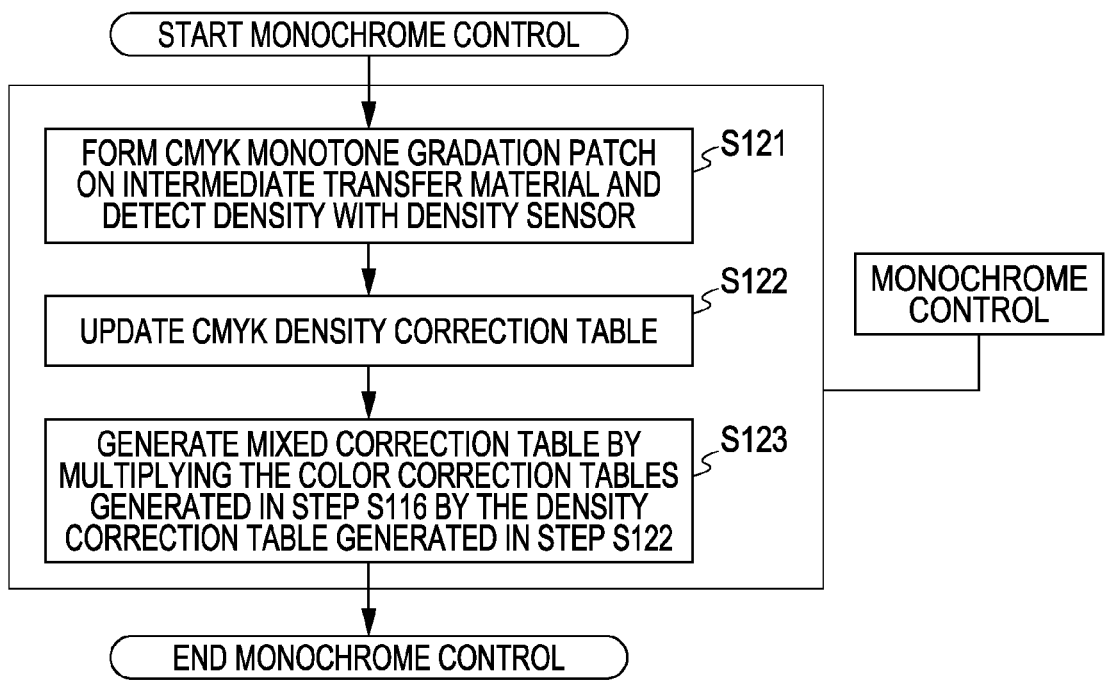
FIG. 5B is a flowchart illustrating details of monochrome density control.

FIGS. 5A and 5B are flowcharts illustrating the details of each control of the above-mentioned mixed color control and monochrome density control. First, the mixed color control shown in FIG. 5A will be described. Here, the relation between the mixed color control and the monochrome density control (according to unfixed patch detection) is "mixed color control=gray axis correction control+monochrome density control".

(1) Details of the Mixed Color Control

Figure 6A:
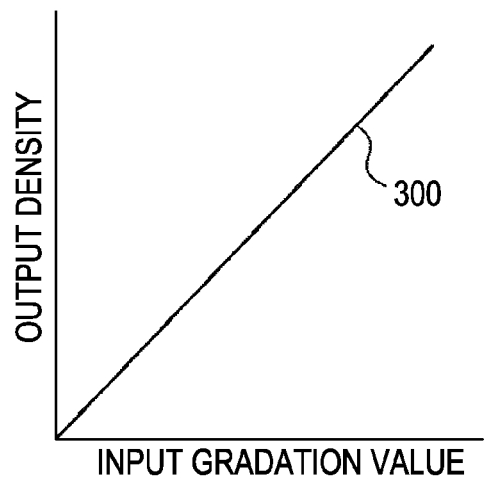
FIGS. 6A through 6C are diagrams describing monochrome density control.

In step S111, the density/gradation control unit 308 employs a predetermined default gradation/density curve as the gradation/density property target of each color of C, M, Y, and K. Note that the default gradation/density curve has been set so as to take into account one or more properties of the color image forming apparatus. The color image forming apparatus according to the present embodiment employs a default gradation/density curve such that output density has a linear relationship with an input gradation value such as shown in FIG. 6A. Next, the density/gradation control unit 308 forms a patch pattern on the intermediate transfer belt 40, the density of which is detected by the density sensor 90 under the control of the density/gradation control unit 308 (step S112).

Figure 6B:
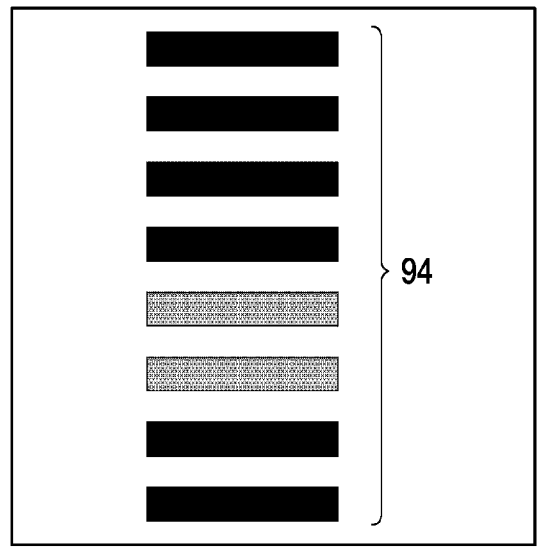
Figure 6C:
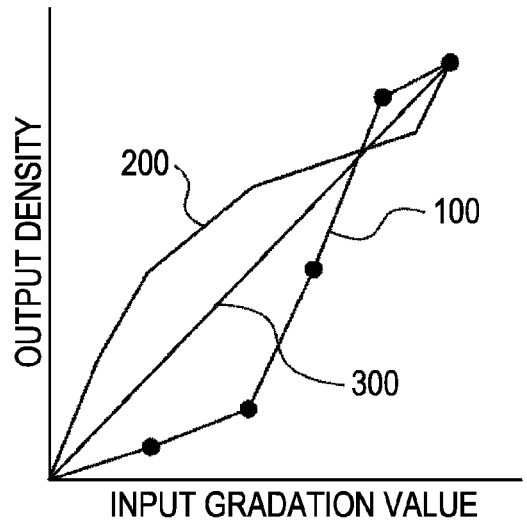

FIG. 6B illustrates an example of a patch pattern formed on the intermediate transfer belt 40. Unfixed K toner monochrome gradation patches 94 are aligned, and subsequently C, M, and Y toner monochrome gradation patches (not shown)

are formed continuously. Initially predetermined gradation values are employed as gradation values of the C, M, Y, and K patches. With the patch pattern formed on the intermediate transfer belt 40, the density is detected by the density sensor 90 under the control of the density/gradation control unit 308, interpolation is performed based on the detection results, and a gradation/density curve is formed. In a case where the density detection results are as shown in filled circles in FIG. 6C, a gradation/density curve such as reference numeral 100 is created by interpolation, such as for example, linear interpolation. Further, in step S111 the control unit 306 calculates an inverse property curve 200 with a set target density curve 300 as a reference, and applies the inverse curve to input image data to obtain a density correction table. Input image data is subjected to table conversion with this density correction table, whereby the relation between input gradation values and output densities becomes the relation of the target gradation/density curve 300 (step S113).

Next, in steps S114 through S117, the gray axis correction control will be described. As described in the detailed description, the gray axis correction control is a method for obtaining the proportion between cyan, magenta, and yellow so that process gray becomes an achromatic color, by employing a color sensor to detect the color information of a color image, after fixing, to obtain gray balance.

In step S114, the image forming unit 307 employs the density correction table 200 generated in step S113 to form multiple mixed color patches on the recording materials wherein one or multiple colors are mixed, under the control of the control unit 306. Note that the term "table 200" as used here may refer to the table itself, or may refer to properties of the table. Also, the image forming unit 307 also forms multiple black monochrome patches. More specifically, the image forming unit 307 forms a plurality of each of the process gray patches including cyan, magenta, and yellow (hereafter, CMY mixed color patches) and K monochrome patch patterns are formed on the recording material P, and detects these by the color sensor 10. The process gray patches and K monochrome patch patterns at this time correspond to the specified print mode or the type of recording material, which will be described later in detail.

The content of the present step will be described below in detail. With the respective patches to be formed, with multiple mixed color patch data (1) through (6) of cyan, magenta, and yellow, and K monochrome data (7) as one set, such as shown in FIG. 7, multiple similar patch sets are formed on the recording materials by one-time gray axis correction control. Let us say that the values of C00 through C05, M00 through M05, and Y00 through Y05 are obtained, for example, by changing any color gradation value from reference values C0, M0, and Y0 (referred to CMY initial values in later description) by ±α. Also, the patch in (7) is a K monochrome patch, and is formed with a predetermined value K0. The reference values (C0, M0, Y0) are values such that the density property of K is adjusted in a state of the gradation/density curve 300, and upon C, M, and Y being mixed in an ideal gradation/density curve state, the mixed color becomes generally the same color as K0.

Figure 8:
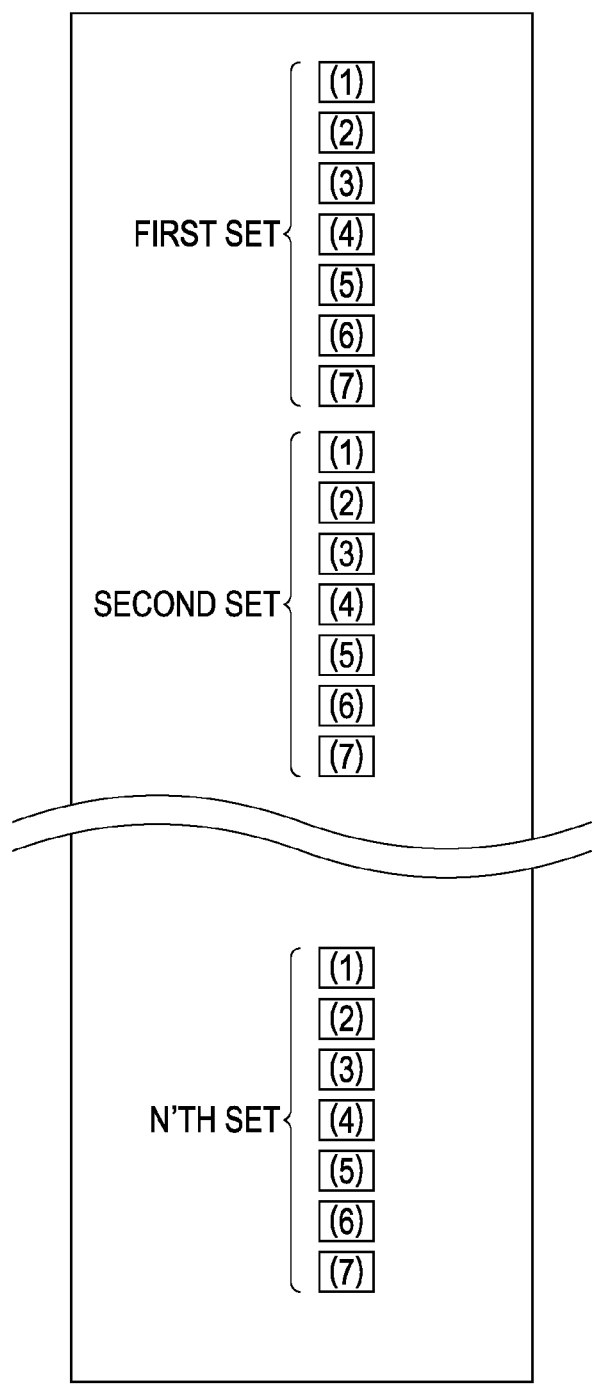
FIG. 8 is a diagram illustrating an example of a test image formed on a recording material employed for the gray axis correction control.
Figure 15:
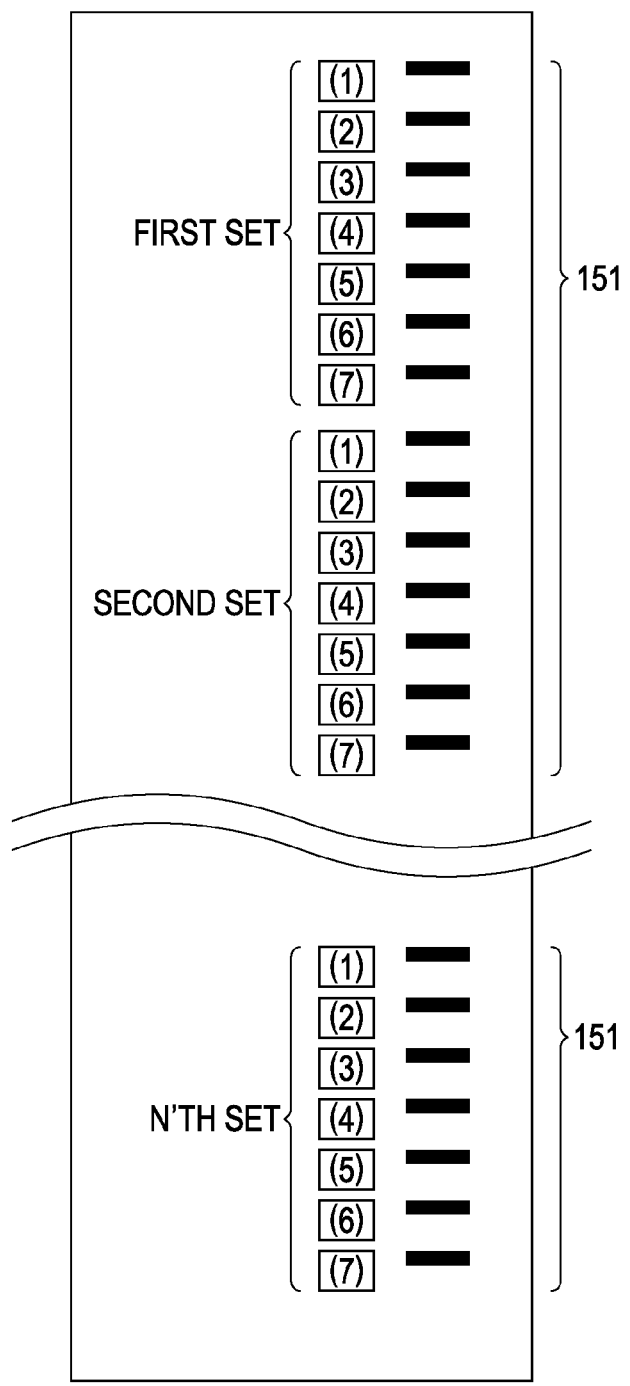
FIG. 15 is a diagram illustrating another example of a test image employed for the gray axis correction control, of the color image forming apparatus.

Multiple sets of patch patterns (1) through (7) are formed on the recording materials such as FIG. 8, the patches formed on the recording material P are detected by the color sensor 10 after passing through the fixer 61, and L*a*b* value is output. Note that another mode of forming patch patterns on the recording material is shown in FIG. 15. With the example in FIG. 15, a patch for position detection 151 is formed individually corresponding to each patch. That is to say, each time a toner patch for position detection is detected, the corresponding patch can be detected with the detection thereof as a reference. For example, one known mode provides one patch for position detection on the top of a patch group. However, with this mode, the length in the conveying direction of each patch has to include a margin while taking into consideration a problem wherein a transfer material 1 slips due to friction of a roller, or the like. However, with the mode in FIG. 15, such margin does not have to be provided, whereby paper length necessary for patch formation, and the amount of toner can be conserved.

Next, in step S115, the control unit 306 calculates the values of C, M, and Y (gradation values) such that the process gray of C, M, and Y and the color of K patch in (7) in FIG. 7 are matched or generally matched, based on the L*a*b* output value of the sensor. Description will be made below regarding the patch detection results of the first set as shown in FIG. 7 as an example.

Let us say that the L*a*b* output values of the respective patches are taken such that (1)=(L00, a00, b00), (2)=(L01, a01, b01), and so on through (6)=(L05, a05, b05), and the L*a*b* output value of K monochrome patch in (7) is taken as (Lk0, ak0, bk0). Here, with regard to a*, as shown in FIG. 9, the coefficients ac0, ac1, ac2, and ac3 form part of the following multiple regression expression along with the gradation values of C, M, and Y as explanatory variates (independent variables), and a* as a criterion variate (dependent variable).

$$a^* = ac1 \times C + ac2 \times M + ac3 \times Y + ac0 \quad \text{(Expression 1)}$$

The coefficients ac0, ac1, and ac3 are obtained as follows $$S = \begin{pmatrix} S_{11} & S_{12} & S_{13} \\ S_{21} & S_{22} & S_{23} \\ S_{31} & S_{32} & S_{33} \end{pmatrix},$$

$$T = \begin{pmatrix} S_{a1} \\ S_{a2} \\ S_{a3} \end{pmatrix},$$

$$B = \begin{pmatrix} ac_1 \\ ac_2 \\ ac_3 \end{pmatrix}$$

where $$S_{11} = \sum_{i=0}^{5} (C_{0i} - \overline{C_0})^2,$$

$$\overline{C_0} = \frac{\sum_{i=0}^{5} C_{0i}}{6}$$

$$S_{22} = \sum_{i=0}^{5} (M_{0i} - \overline{M_0})^2,$$

$$\overline{M_0} = \frac{\sum_{i=0}^{5} M_{0i}}{6}$$

$$S_{33} = \sum_{i=0}^{5} (Y_{0i} - \overline{Y_0})^2,$$

$$\overline{Y_0} = \frac{\sum_{i=0}^{5} Y_{0i}}{6}$$

-continued $$S_{12} = \sum_{i=0}^{5} (C_{0i} - \overline{C_0}) \times (M_{0i} - \overline{M_0})$$

$$S_{13} = \sum_{i=0}^{5} (C_{0i} - \overline{C_0}) \times (Y_{0i} - \overline{Y_0})$$

$$S_{23} = \sum_{i=0}^{5} (M_{0i} - \overline{M_0}) \times (Y_{0i} - \overline{Y_0})$$

$$S_{21} = S_{12},$$

$$S_{31} = S_{13},$$

$$S_{32} = S_{23}$$

$$S_{R1} = \sum_{i=0}^{5} (C_{0i} - \overline{C_0}) \times (a_{0i} - \overline{a_0}),$$

$$\overline{a_0} = \frac{\sum_{i=0}^{5} a_{0i}}{6}$$

$$S_{R2} = \sum_{i=0}^{5} (M_{0i} - \overline{M_0}) \times (a_{0i} - \overline{a_0})$$

$$S_{R3} = \sum_{i=0}^{5} (Y_{0i} - \overline{Y_0}) \times (a_{0i} - \overline{a_0})$$

and substituting these in the above expressions to reorganize yields the following simultaneous equations.

$$S_{a1} = S_{11}ac_1 + S_{12}ac_2 + S_{13}ac_3$$

$$S_{a2} = S_{21}ac_1 + S_{22}ac_2 + S_{23}ac_3$$

$$S_{a3} = S_{31}ac_1 + S_{32}ac_2 + S_{33}ac_3 \qquad \text{(Expression 2)}$$

When representing (Expression 2) with the matrixes B, S, and T, SB=T holds. This can also be represented as B=S⁻¹T and accordingly, ac1, ac2, and ac3 are obtained. Note that Gaussian Elimination, or the like, may be used as a method for obtaining S⁻¹. Further, according to $$ac_0 = \overline{a_0} (ac_1 \times \overline{C_0} + ac_2 \times \overline{M_0} + ac_3 \times \overline{Y_0})$$

a constant term ac0 is obtained.

Further, similarly, as to L* and b* as well, the coefficients of the following multiple regression expressions are obtained.

$$L^* = lc1 \times C + lc2 \times M + lc3 \times Y + lc0$$

$$b^* = bc1 \times C + bc2 \times M + bc3 \times Y + bc0$$

Here, if we say that the values of C, M, and Y corresponding to the output value of K (lk0, ak0, bk0) are (C0', M0', Y0'), and these are substituted for the above-mentioned expressions, and upon these being rewritten as matrixes, $$\begin{pmatrix} lk_0 \\ ak_0 \\ bk_0 \end{pmatrix} = \begin{pmatrix} lc_1 & lc_2 & lc_3 \\ ac_1 & ac_2 & ac_3 \\ bc_1 & bc_2 & bc_3 \end{pmatrix} \begin{pmatrix} C'_0 \\ M'_0 \\ Y'_0 \end{pmatrix} + \begin{pmatrix} lc_0 \\ ac_0 \\ bc_0 \end{pmatrix}$$

is obtained, and further, upon this being reorganized, $$\begin{pmatrix} C'_0 \\ M'_0 \\ Y'_0 \end{pmatrix} = \begin{pmatrix} lc_1 & lc_2 & lc_3 \\ ac_1 & ac_2 & ac_3 \\ bc_1 & bc_2 & bc_3 \end{pmatrix}^{-1} \begin{pmatrix} lk_0 - lc_0 \\ ak_0 - ac_0 \\ bk_0 - bc_0 \end{pmatrix}$$

is obtained.

Thus, (C0', M0', Y0') are obtained. Note that in a case of actually obtaining (C0', M0', Y0') with the color image forming apparatus, numerical rounding off is performed. Accordingly, expressions to the effect that the chromaticity of the process gray of C, M, and Y, is identical to the chromaticity of K patch, in the present embodiment mean that both are generally matched. Further, the gradation value of K is changed, thereby providing multiple reference values corresponding to the respective Ks (CN, MN, YN, KN) (N=0, 1, 2, and so on through n). Subsequently, (CN', MN', YN', KN') are obtained as to the respective reference values (CN, MN, YN, KN) based on the same patch sets of (1) through (7) as described above.

Figure 10A:
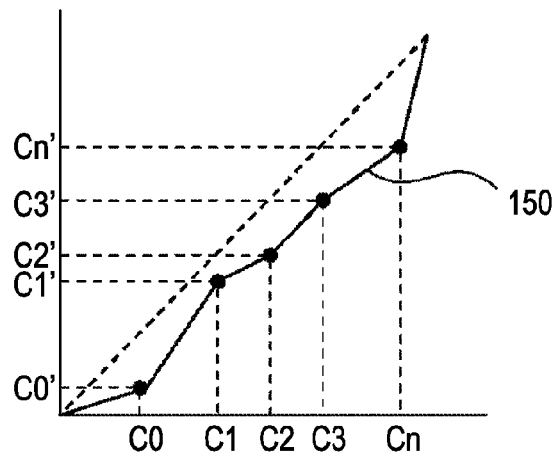
FIGS. 10A and 10B are diagrams illustrating an example of gradation input/output property according to the gray axis correction control.
Figure 10B:
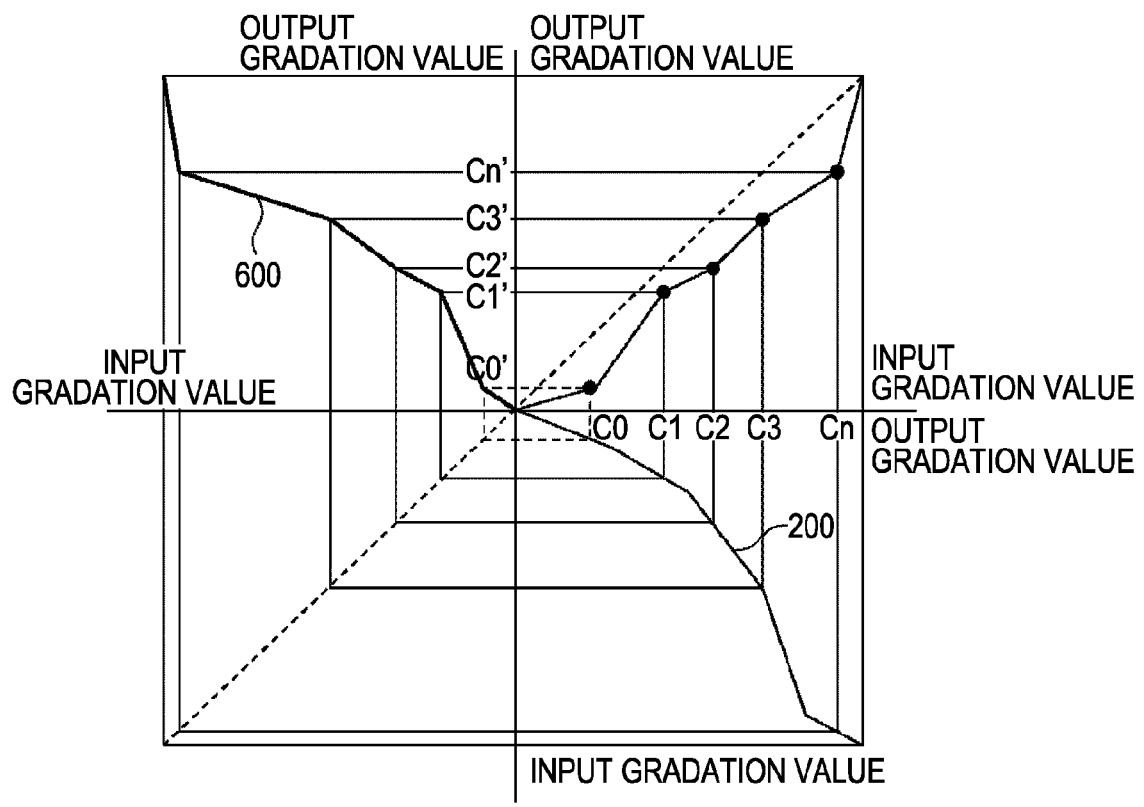

Upon the cyan relations between the (CN, MN, YN) and (CN', MN', YN') thus obtained becoming such as filled circles in FIG. 10, between the filled circles are subjected to, for example, linear interpolation to create a curve such as reference numeral 150 (step S116). Subsequently, this curve is multiplied by the density correction table updated/created in step S113 to create a gradation/density curve, and a gradation value conversion table 600 (mixed correction table) shown in the second quadrant in FIG. 10B is created (step S117).

Image formation is performed by employing this, and accordingly, the color made up of the mixed colors of (CN, MN, YN) is identical to the color of KN. Thus, the color correction table serving as the gray axis correction control results is employed for the subsequent image formation as a mixed color correction table, whereby the a high quality image with good gray balance can be obtained. It goes without saying that the color correction table alone may be employed, whereby a high quality image with good gray balance can be obtained in the same way as described for the above-mentioned mixed color correction table.

Note that the values of (CN, MN, YN, KN) can be selected while taking into consideration the fact that human eyes are sensitive to highlighted gray, and are insensitive as the color approximates shadow. Further, the values of (CN, MN, YN, KN) can be selected while taking into consideration the fact that UCR processing (processing for replacing a portion of CMY with K at the time of color separation) is performed at the time of normal color processing, so gray with three colors alone of CMY does not emerge in a shadow region. Also, the values are selected centered on highlight, whereby the gray axis correction control can be performed more effectively.

Also, an arrangement may be made wherein a color conversion table is provided which is updated each time by employing the gray axis correction control results, which is correlated with the color matching table at the time of normal color processing, thereby performing the gray axis correction control from highlight to shadow.

Detailed description of the mixed color control has been made so far, and at the time of the subsequent print, this mixed correction table is employed to perform the density correction of input image data, thereby entering a normal print state. Also, as described in step S107 in FIG. 4 as well, upon the number of stipulated sheets being printed in a normal print state, the monochrome density control is performed.

<(2) Details of the Monochrome Density Control (According to Detection of Unfixed Patches)>

Next, description will be made regarding the details of the monochrome density control shown in FIG. 5B. With the monochrome density control, in step S121, in the same as with step S112, a patch pattern is formed on the intermediate transfer belt 40, and this is read by the density sensor 90 under the control of the density/gradation control unit 308. The patch pattern formed on the intermediate transfer belt is detected by the density sensor 90, the control unit 306 creates a gradation/density curve by interpolation based on the detected density, and updates the density correction table in the same way as with step S113 (step S122). Subsequently, again, in the same way as with step S117, the control unit 306 multiplies the color correction table 150 of each color created in step S116, and the density correction table 200 created in step S122 to update the mixed correction table (step S123).

Thus, the results of the gray axis correction control whereby desired process gray chromaticity can be reproduced while taking into consideration fluctuation of the secondary transfer and thereafter are combined, whereby color reproducibility approximate to a case where the mixed color control is performed by the monochrome density control can be achieved.

Note that with the present embodiment, an arrangement has been made wherein the mixed correction table is created by multiplying the density correction table 200 and color correction curve 150, but an arrangement may be made wherein the target of the monochrome density control is corrected. Also, with the present embodiment, three-dimensional linear interpolation is employed for calculating the optimal values of C, M, and Y, but as the method of interpolation, a nonlinear method such as quadratic function approximation, cubic function approximation, or spline interpolation may be employed. Also, with the present embodiment, as the value of a, the same value is employed for C, M, and Y, but a different value may be employed for each color.

Further, with the present embodiment, the color sensor outputs L*a*b*, but may output another color-coordinate-system chromaticity, such as RGB values, L*c*h*, XYZ, or the like. Further, the color of the mixed color patch of C, M, and Y has been matched with the color of K patch, but the present invention is not restricted to this. For example, an arrangement may be made wherein the L*a*b* value of the mixed color patch of C, M, and Y, or the like is measured by the color sensor, and for example, an appropriate gradation value is calculated such that the mixed color of C, M, and Y becomes an achromatic color with the achromatic color axis of a=0 and b=0 as a target, and the calculated value is fed back to the monochrome density control.

<Density/Gradation Property Difference Due to Difference in Print Mode (Recording Material Type)>

As described above, with the image forming apparatus employing the electrophotographic method, in general, several types of print modes are provided wherein the types are classified according to the basis weight and surface property of recording material, or the like, and print speed, transfer bias, or the like is changed. With such print modes, transfer efficiency and glossiness after fixing are changed according to the difference of the surface property, basis weight, thickness of recording material, and so forth. That is to say, when the type of recording material (print mode) differs, gradation/density property also differs. As an example of this, description will be made of an example employing the same color media (or ink) as those filled in a cartridge for color laser printer LBP5400 manufactured by CANON KABUSHIKI KAISHA (cartridge model numbers: CRG-311CYN, CRG-311MAG, CRG-311YEL, and CRG-311BLK). Note that, at this time, as recording material for standard print mode, color laser copier paper (81.4 g/m$^2$) has been employed and output, and as recording material for glossy paper print mode, HP Color Laser Glossy Photo Paper (220 g/m$^2$) has been employed and output.

Figure 11:
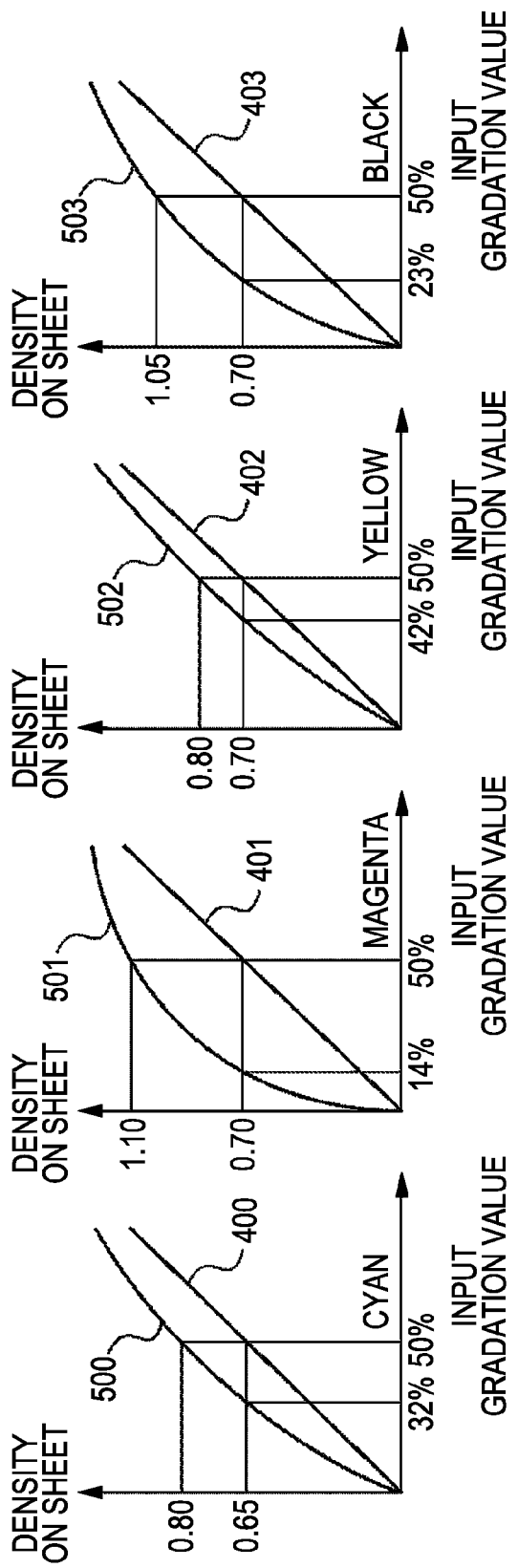
FIG. 11 is a diagram illustrating gradation property difference in a standard print mode and glossy paper print mode as an example of the gradation property difference between print modes.

The gradation property difference between the standard print mode and glossy paper print mode at this time is shown in FIG. 11. Note that the respective process conditions of the standard print mode and glossy paper print mode when obtaining this data are as follows.

TABLE 1

|  | STANDARD PRINT MODE | GLOSSY PAPER PRINT MODE |
| --- | --- | --- |
| PROCESS SPEED (mm/sec) | 190.0 | 63.3 |
| FIXING TEMPERATURE (° C.) | 190 | 180 |
| CHARGE POTENTIAL (Vdark) (V) | 400 | 400 |
| DEVELOPING BIAS (V) | 250 | 250 |
| EXPOSURE POTENTIAL (VL) (V) | 75 | 75 |

In FIG. 11, with gradation/density properties 400 through 403 in the standard print mode, the chromaticity from paper white increases linearly as to input gradation value regarding all colors, but on the other hand, gradation/density properties 500 through 503 in the glossy paper print mode become further upper convex gradation/density properties as compared to the standard print mode. Thus, it can be understood from FIG. 11 that there is density/gradation property difference according to the difference of print modes.

<Detection Results of CMY Mixed Color Patches and K Monochrome Patches According to Related Art>

Figure 12A:
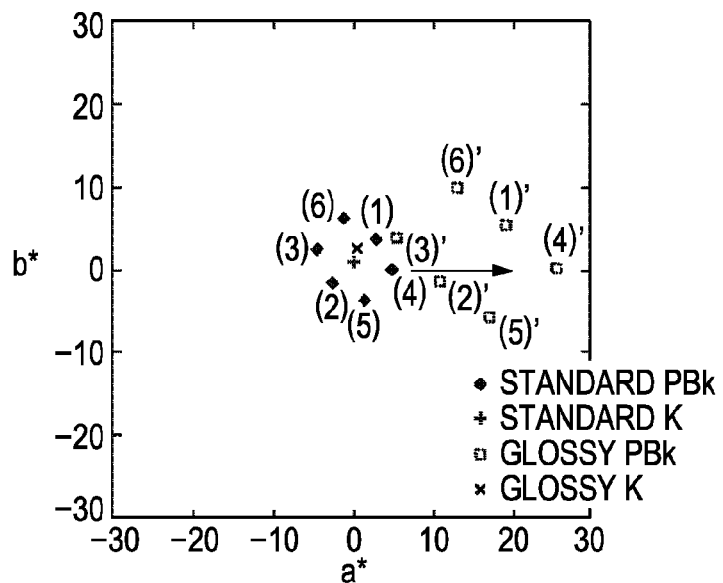
FIGS. 12A through 12C are diagrams illustrating an example of the chromaticity results obtained by the color sensor detecting a CMY mixed color patch pattern and K monochrome patch pattern employed for the gray axis correction control.
Figure 12B:
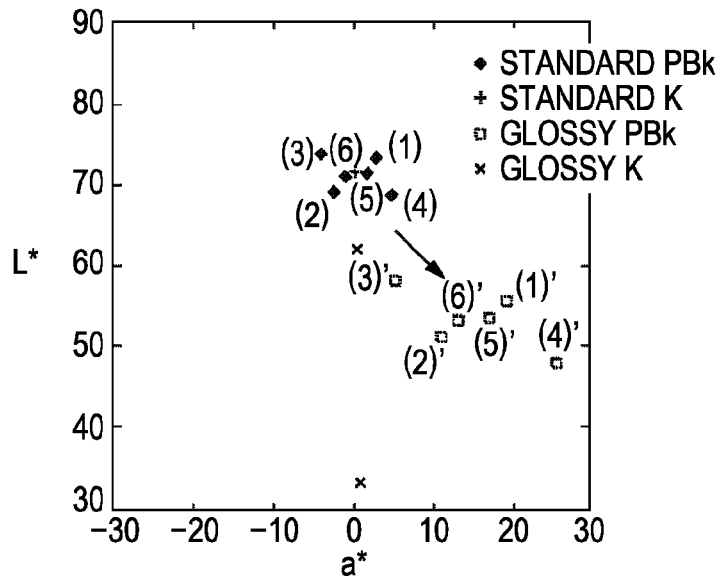
Figure 12C:
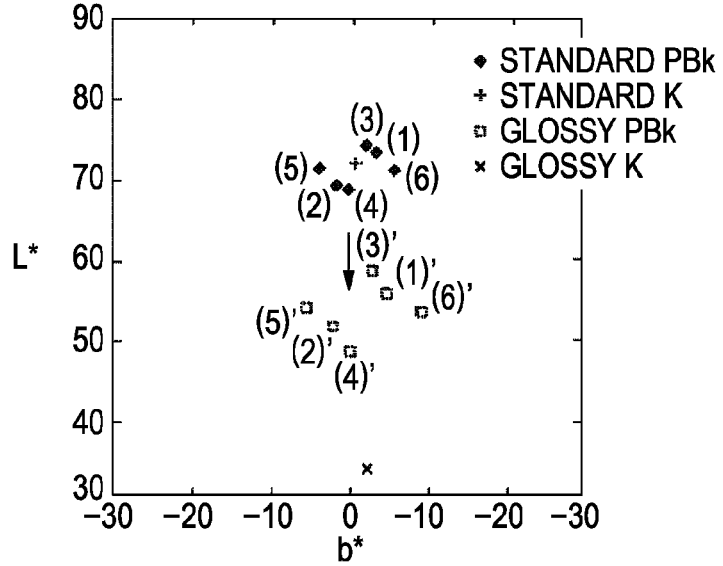

Next, the chromaticity results obtained by the color sensor 10 detecting CMY mixed color patch patterns and K monochrome patch patterns employed for the above-mentioned gray axis correction control are shown in FIGS. 12A through 12C. Note however, these results are results output in the glossy paper print mode and standard print mode by employing the density correction table which is updated in step S113, and realizes desired gradation/density properties when printing in the standard print mode.

FIG. 12A illustrates a chromaticity distribution at an a*-b* cross-section, FIG. 12B illustrates a chromaticity distribution at an a*-L* cross-section, and FIG. 12C illustrates a chromaticity distribution at a b*-L* cross-section. As shown in the drawings, the CMY mixed color patch chromaticity distributions in the glossy paper print mode (glossy PBk in FIGS. 12A through 12C) are shifted in a direction wherein L* becomes smaller, and also in +a* direction, as compared to those in the standard print mode (standard PBk in FIGS. 12A through 12C). That is to say, from the monochrome chromaticity of K serving as a reference (glossy K and standard K in FIGS. 12A through 12C) the CMY mixed color gray patch chromaticity is shifted greatly. Next, description will be made regarding the reason wherein the CMY mixed color patch chromaticity in the glossy print mode is shifted in a direction wherein L* becomes smaller, and also in +a* direction.

First, the reason why L* becomes smaller is, as shown in FIG. 11, the gradation/density properties 500 through 503 in the glossy paper print mode become further upper convex gradation/density properties as compared to the standard print mode, i.e., the density thereof becomes denser over the entire gradation value region. With the image forming apparatus based on the principle of additive mixture of colors, when using such an image forming apparatus, the brightness (=L*) becomes darker (smaller) as the color of a compositional color becomes denser.

Figure 13:
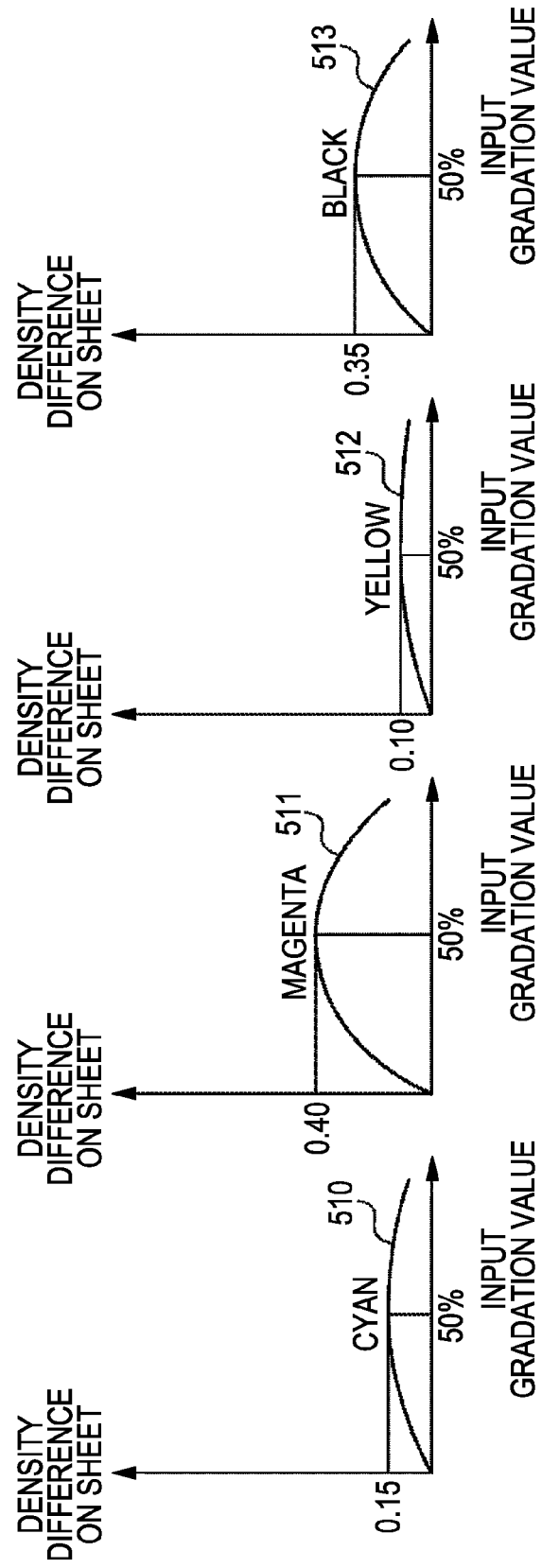
FIG. 13 is a diagram illustrating an example of density difference on a sheet as to an input gradation value between the standard print mode and glossy paper print mode.

Next, the reason why the CMY mixed color patch chromaticity distributions in the glossy paper print mode are shifted in +a* direction will be described. FIG. 13 illustrates the density difference between the standard print mode and glossy paper print mode on sheets wherein the same input gradation value is used. Also, FIG. 14 illustrates a monochrome patch hue curve of each color of cyan, magenta, yellow, and black, from white paper through to solid image on the color laser copier paper (81.4 g/m$^2$), output in accordance with the above-mentioned standard print mode output conditions.

Figure 14:
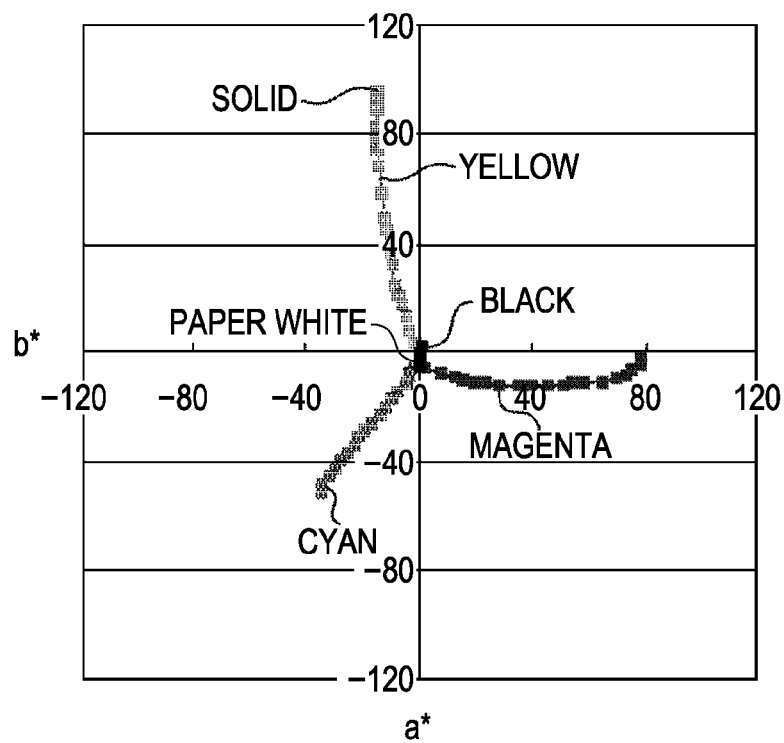
FIG. 14 is a diagram illustrating the hue curve of each monochrome patch of cyan, magenta, yellow, and black, of the color image forming apparatus.

The following can be understood from FIGS. 13 and 14. With the color image forming apparatus according to the present embodiment, the color difference of magenta is greater than cyan and yellow. Generally, even if there is density property difference between print modes, the process gray patch subjected to color mixture varies only in a contrasting (i.e., L*) direction and does not readily vary in the hue direction (a* and b*), if there is no property difference between colors. However, in this case, there is a property difference between colors as magenta has greater print mode difference than the other colors. In FIG. 14, magenta becomes greater in +a* direction as the gradation value becomes greater from paper white. That is to say, each color has a different gradation property difference between print modes. For magenta the difference increases in +a* direction, and accordingly, the test image chromaticity (patch chromaticity) is shifted in +a* direction in the glossy paper print mode.

<Estimation Precision of Multiple-Regression Calculation>

Next, description will be made regarding the precision of a multiple-regression calculation in a case where the test image chromaticity is shifted from the K monochrome chromaticity serving as the reference of the gray axis correction control. Specifically, description will be made below how the gradation value proportion of cyan, magenta, and yellow making up the optimal process gray of which the chromaticity becomes the same or generally the same as the chromaticity of the target black can be precisely calculated in a case where chromaticity shift occurs.

In general, as can be apparent from the above-mentioned definition of (Expression 1), multiple-regression analysis assumes that an explanatory variate and a criterion variate have linear correlation relations. However, with the electrophotographic-type of image forming apparatus, in general, the relation between an input gradation value and the chromaticity of a sample to be output has strong nonlinearity. This can be imagined from the fact that, in order to convert RGB format image data to be handled with a PC or the like into the CMYK format of a printer, in general, a fine grating point table such as 173×84 is configured, and further interpolation calculation is performed, thereby performing color conversion.

Therefore, as the distance on color space between the CMY mixed color patch chromaticity employed for the above-mentioned multiple-regression calculation, and the monochrome chromaticity of K serving as a reference is separated, the linear correlation relations between the CMY mixed color patch chromaticity and the CMY input gradation values are lost, and accordingly, estimation precision is deteriorated. That is to say, in order to precisely calculate the values of C, M, and Y (gradation values) by the multiple-regression calculation such that the process gray of C, M, and Y, and the color patch of K in (7) of FIG. 7 are matched or generally matched, the color difference between the chromaticity of the patch of K serving as a target, and the CMY mixed color patch chromaticity, has to be set within a certain range.

Therefore, with the present embodiment, in order to suppress chromaticity shift of a test image due to the fact that the gradation property difference between print modes differs for each color, an arrangement is made wherein the density/gradation property equivalent to that in the plain paper print mode is obtained. Specifically, the input image data of a mixed color patch is converted according to the gradation correction table between print modes, thereby performing the gray axis correction control. Description will be made below regarding a flowchart in a case where the gray axis correction control is performed in a print mode different from the standard print mode, with reference to FIG. 16.

<Flowchart of the Gray Axis Correction Control According to Print Modes (Recording Material Types)>

Figure 16:
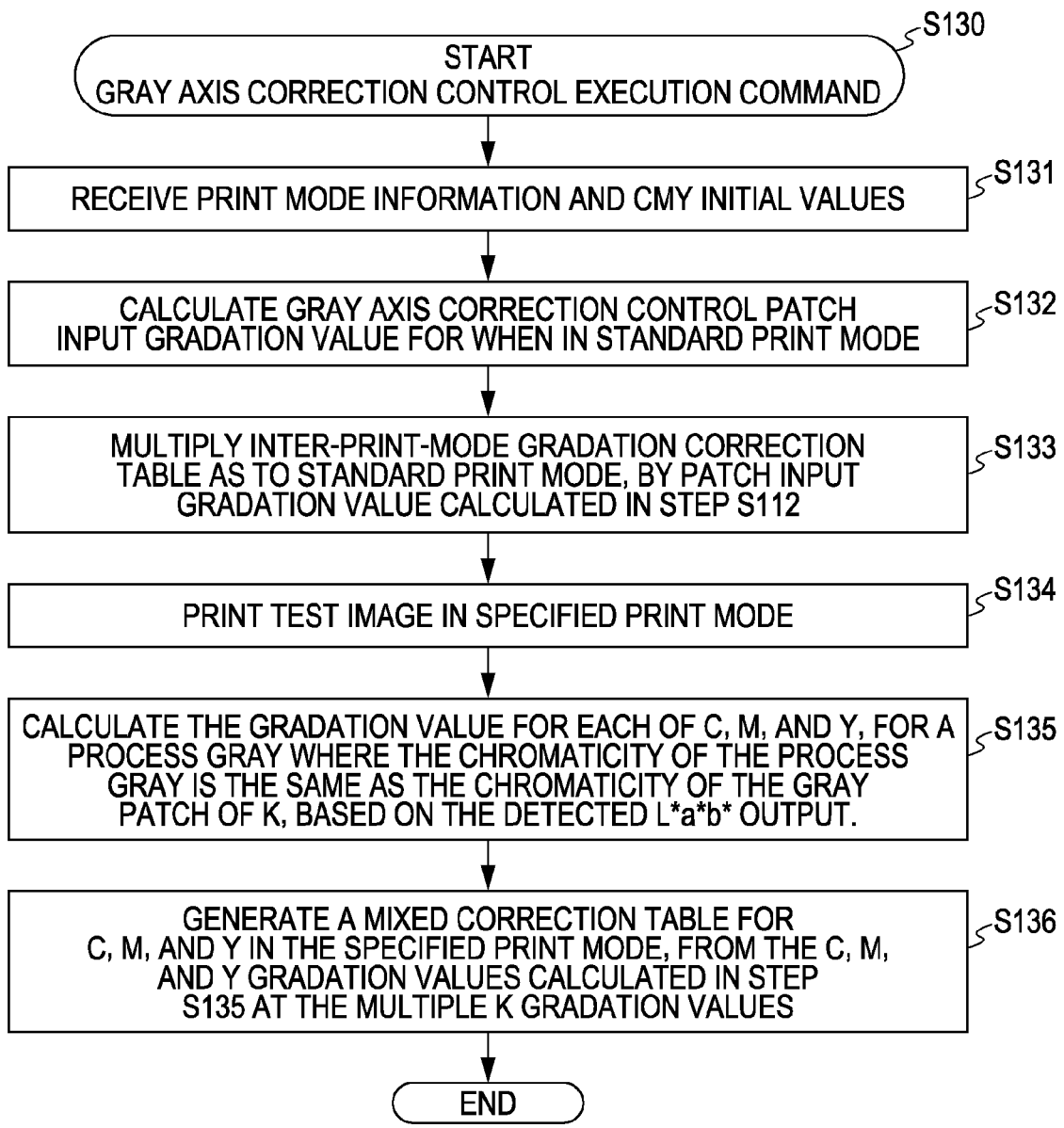
FIG. 16 is an example of a flowchart for executing the gray axis correction control according to the specified print mode.

The flowchart in FIG. 16 is a diagram for describing processing in a case where the gray axis correction control is performed in a print mode different from the standard print mode.

First, in step S130, a gray axis correction control execution command is transmitted to the control unit 306 of the image forming apparatus from the printer controller 302 through the video interface unit 305 at predetermined timing such as instruction timing through the operation panel 303 by the user, or cartridge replacement, or the like.

Next, in step S131, the control unit 306 receives the specification of a print mode (recording material type) from the printer controller 302 to determine what kind of print mode has been specified (first print mode or second print mode). The print mode specified from the printer controller 302 is determined based on a print instruction input by the user, or the print mode (recording material type) set to a paper feed tray to be employed. Hereinafter, let us say that in step S131, print mode information (corresponding to information regarding the type of recording material) and CMY initial value information are received. Note that step S131 has been described as a step separately from step S130, but it goes without saying that step S131 may be executed along with step S130. Now, the meaning of the CMY initial values will be described. First, let us make an assumption regarding the state of a particular apparatus. In the state of the particular apparatus, there is no deterioration or the like at the time of shipping, and the density property has been adjusted in the state of the gradation/density curve 300 (FIG. 6C) in a particular print mode. With the apparatus in this particular state, the CMY initial values are CMY values which cause the color obtained by mixing the colors of C, M, and Y to become the same or generally the same as the monochrome of K. The CMY initial values are equivalent to, for example, the above-mentioned C0, M0, and Y0. In reality, the CMY initial values are held by the number corresponding to each of the first set, second set, and so on in FIG. 7, and in step S131, the control unit 306 receives these multiple CMY initial values from the printer controller 302. Also, with regard to the print instruction information, there may be a print mode specification included in the print data (job data) to be input to the printer controller 302 from the PC shown in FIG. 2 through a network.

Next, in step S132, the control unit 306 calculates a gray axis correction control patch input gradation value in the standard print mode by an unshown input gradation value computing program of a test image for the gray axis correction control based on the CMY initial value information received from the printer controller 302 in step S131. Here, let us say that the calculated values are obtained by changing a particular color alone from the reference values (CN, MN, YN) by ±α, as described above.

In step S133, the control unit 306 converts (calculates) the patch input gradation value calculated in step S132 into a test image input gradation value suitable for the specified print mode based on an inter-print-mode gradation correction table as to the standard print mode.

On the other hand, in a case where the standard print mode (plain paper) has been specified as the print mode (media) in step S131, the control unit 306 omits the processing in step S133, and executes step S134 by employing the patch input gradation value calculated in step S132.

Which kind of an inter-print-mode gradation correction table to employ is determined by what kind of print mode is specified from the print controller 302. Accordingly, in a case where the print mode determined in step S132 is the first print mode, a combination of the first respective gradation values suitable for the first print mode is calculated, and a mixed color patch following the calculation is formed. On the other hand, in a case where the print mode specified from the printer controller 302 is the second print mode, unlike the previous combination of the first respective gradation values, a mixed color patch is formed by a combination of the second respective gradation values.

<Specific Example of Inter-Print-Mode Gradation Correction Table>

Figure 17:
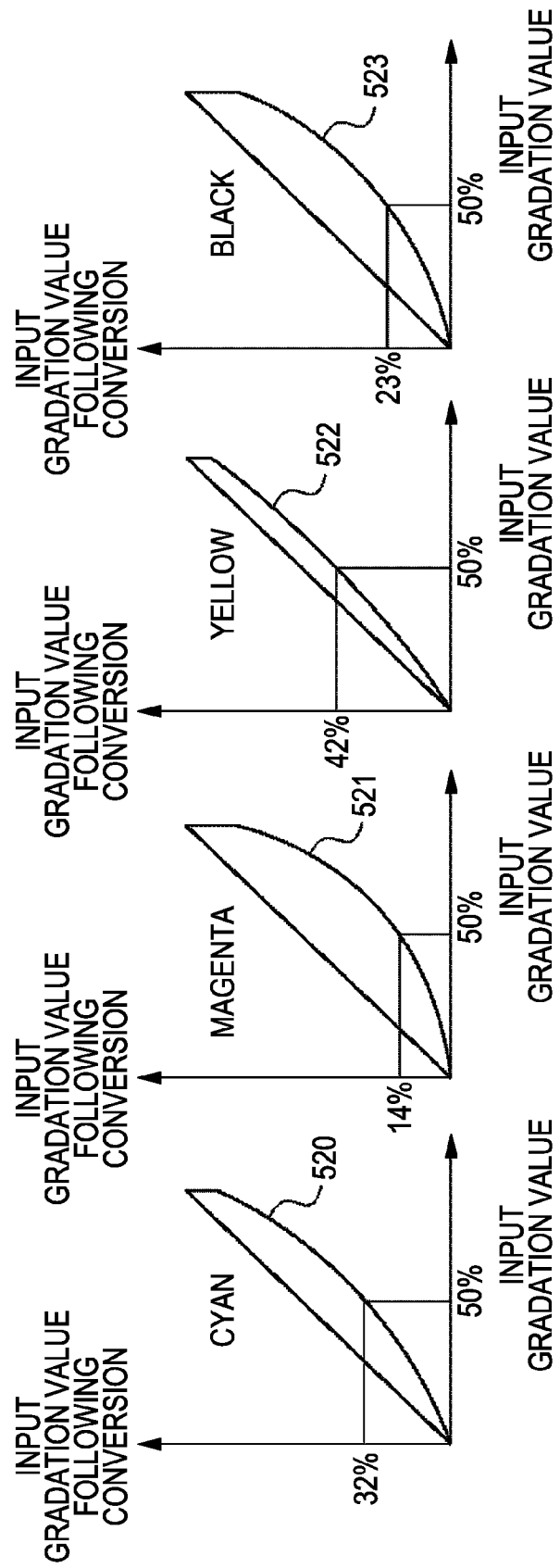
FIG. 17 is a diagram illustrating an example of gradation correction between the print modes of the standard print mode and the other print modes of the color image forming apparatus.

FIG. 17 illustrates an example of the inter-print-mode gradation correction table as to the standard print mode. These curves 520 through 523 respectively have an inverse relationship to the density/gradation curves 500 through 503 in the glossy paper print mode with respect to the gradation/density property curves 400 through 403 in the standard print mode after the monochrome density control shown in FIG. 11. Description will be made first regarding how to obtain a curve of inverse property with cyan in FIG. 11 as an example.

The gradation/density property curve 400 in the standard print mode after the monochrome density control, and the density/gradation property 500 in the glossy paper print mode are compared. Subsequently, based on the comparison results, the input gradation value (e.g., 32%) for obtaining, in the glossy paper print mode, the same density as the density on sheets (e.g., 0.65) as to the input gradation value (e.g., 50%) in the plain paper print mode is obtained as an input gradation value after conversion. Subsequently, the input gradation value after conversion is repeatedly obtained as to each density on the sheets.

Subsequently, the obtained input gradation value is correlated with the input gradation value after conversion, whereby the curves 520 through 523 in FIG. 17 can be created. Subsequently, in step S134, the control unit 306 multiplies the table 520 through 523 and the patch input gradation values calculated in step S132, thereby, as a fixed patch, forming a test image on the recording material through the primary transfer and secondary transfer in the specified print mode. More specifically, based on the CMY initial values calculated in step S133, a necessary number of mixed color patches and black monochrome patches such as shown in FIG. 7 are created.

With the plots in the L*a*b* space of the test image obtained according to the inter-print-mode gradation correction table in FIG. 17, both of the process gray and black become generally the same hue and brightness at the time of the standard print mode in FIGS. 12A through 12C. This is a result obtained by absorbing the gradation property difference between print modes with the patch input gradation values of a test image beforehand, whereby the gradation property difference between the specified print mode and the standard print mode becomes negligible. Thus, even in a print mode other than the standard print mode, the color difference between the chromaticity of the patch of K serving as a target and the CMY mixed color patch chromaticity employed for the multiple-regression calculation can be included in a certain color difference range. As a result thereof, a mixed color patch can be formed and detected by a combination of the respective gradations of the respective colors suitable for the specified print mode. Accordingly, in a case where the detection results of the color sensor are plotted in the color space of L*a*b*, the detection results of black can be included in the detection results of a mixed color patch, and the estimation precision of the multiple-regression calculation can be improved. As a specific example, plot points (1) through (6) include standard K (+) and glossy K (x) on the color space of L*a*b* of standard Bk in FIG. 12, thereby improving the precision of the multiple-regression calculation.

Subsequently, the control unit 306 calculates each gradation value of C, M, and Y of the process gray wherein the chromaticity of the process gray becomes the same or generally the same as the chromaticity of the gray patch by K, from the detected L*a*b* output by the multiple-regression calculation (step S135, the same as step S115 in FIG. 5). Here, the test image chromaticity detection results printed in step S134 become values approximate to the normal print mode. On the other hand, patch input gradation values become gradation values different from the normal print mode by the inter-print-mode gradation correction table in step S133, so each gradation value of C, M, and Y calculated in step S135 differs from the results in the normal print mode.

Note that the present embodiment calculates each gradation value of C, M, and Y of the process gray so that the chromaticity of the process gray becomes the same or generally the same as the chromaticity of the gray patch by K (black). However, in a case where the updated density/gradation property of K is not suitable, and accordingly, the brightness of K serving as a reference fluctuates and cannot be ignored (e.g. in a case wherein only brightness fluctuates to where E>3 holds, exceeding the color difference which humans permit), the brightness fluctuation of CMY mixed color gray occurs following this fluctuation of K in some cases. As a result thereof, color processing properties and halftone properties may shift away from the properties set for each color at the design stage. In order to avoid this, an arrangement may be made wherein the gradation value of K serving as target brightness is calculated first from the gray patch chromaticity of K detected in step S135 beforehand, and subsequently, each gradation value of C, M, and Y of the process gray of which the chromaticity becomes the same chromaticity as the prediction chromaticity as to the predicted K gradation value thereof, is calculated.

In step S136, the control unit 306 creates, in the same way as with step S117 in FIG. 5, the mixed correction table of C, M, and Y in the specified print mode from each gradation value of C, M, and Y calculated in step S135 with multiple gradation values of K. The subsequent processing at the time of image formation is the same as the gray axis control method described in FIG. 5.

The above-mentioned processing is performed, thereby creating a patch to which the difference of the types of recording materials or the types of print modes is added, for example, in a case where the types of recording materials differ such as plain paper and glossy paper, or the type of print mode differs, and accordingly, excellent gray balance adjustment results can be obtained. Further, the gray axis correction control according to a print mode other than the standard print mode can be performed over a short amount of time without performing monochrome density control in each print mode to adjust the gradation property beforehand. Thus, with the present embodiment, even in a print mode other than the standard print mode, in the same way as with the standard print mode, excellent density/gradation property and chromaticity property can be reproduced on sheets.

Note that with the above-mentioned example, magenta has greater gradation property difference due to the difference between print modes than the other colors, so the chromaticity of a test image is shifted in +a* direction. However, in general, any color may have greater difference due to the difference of transfer property according to toner charge quantity, difference of chromogenic property due to fixing or of type of color materials employed for the image forming apparatus so the shift is not restricted to +a* direction. Also, description has been made only regarding the glossy paper print mode, but the inter-print-mode gradation correction table may hold multiple print modes. Also, the inter-print-mode gradation correction table may be variable depending on the use environment of the image forming apparatus, and the use range of a cartridge.

<Another Form of FIG. 16>

Description has been made so far regarding an example employing the inter-print-mode gradation correction table. However, the present invention is not restricted to this. Specifically, description will be made regarding an embodiment wherein the gray axis correction control is performed in each print mode without employing the above-mentioned inter-print-mode gradation correction table. The point of different from the above description is as follows.

The present embodiment takes into consideration the density/gradation property difference due to the types of print modes and recording material types beforehand to set the target gradation property of the gray axis correction control. For example, each gradation value of each process gray patch calculated in step S135 in FIG. 16 is stored in memory (e.g., ROM 310 serving as a storage unit) beforehand, and these are read out to perform step S136 in FIG. 16, thereby performing the gray axis correction control. In the following, as an example, the gradation property difference between the standard print mode and glossy paper print mode is taken into consideration beforehand to set the target gradation property of the gray axis correction control.

Description will be made below regarding the present embodiment with reference to the flowchart in FIG. 18. First, in step S230, in the same way as with the first embodiment, a gray axis correction control execution command is transmitted to the image forming processing unit of the image forming apparatus from the printer controller 302 at predetermined timing such as an execution instruction from the operation panel 303, or cartridge replacement, or the like.

Next, in step S231, the printer controller 302 transmits print mode information (information of kinds of recording material) and the CMY initial values corresponding to the type of recording material or the type of print mode, and the control unit 306 receives these. The CMY initial values at this time are the same values as the results calculated in step S135 in FIG. 16 described above.

Now, examples of the CMY initial values according to the print mode are shown in FIGS. 19A through 19C. Let us say that this information in FIGS. 19A through 19C is stored beforehand in the ROM 310 which the control unit 306 can reference, with the flowchart in FIG. 18.

In FIG. 19A, the thin paper print mode of which the gradation property is generally the same as that in the plain paper print mode is taken as a type A similar to the plain paper print mode. Also, the thick paper print mode of which the gradation property is generally the same as that in the glossy paper print mode is taken as a type B similar to the glossy paper print mode. Subsequently, according to each print mode within FIG. 19A, FIG. 19B which is the type A, and FIG. 19C which is the type B, are shown as two types of CMY initial values. The two types of CMY initial values are determined based on each target gradation property in the plain paper print mode and glossy paper print mode such as shown in FIGS. 11 and 17. Also, in FIGS. 19B and 19C, each gradation of a first through eighth gradations corresponds to each of the first set, second set, third set, and so on through eighth set described in FIG. 7. Note that, in FIGS. 19A through 19C, the gradation value of K is not shown, but in reality, we will say that each gradation value is prepared corresponding to each of the print modes and each of the corrected first gradation value through corrected eighth gradation value beforehand, and is stored in the ROM 310 as well as the CMY initial values beforehand. Referring to FIG. 11 as an example, in a case where each of CMYK in the standard print mode is a gradation value of 50%, in the glossy paper print mode, with regard to CMY, the gradation values of 32%, 14%, and 42% as the CMY initial values, and 23% as the value of K, are stored in the memory beforehand. It goes without saying that the values of 32%, 14%, 42%, and 23% themselves are examples, and optimal values should be employed as appropriate. Also, the above-mentioned value of 50% is equivalent to one of the corrected gradation values in each of FIGS. 19B and 19C, and actually, initial values relating to multiple types of gradation values are prepared. In FIGS. 19B and 19C, these are shown as the corrected first gradation value, corrected second gradation value, and so on to the corrected eighth gradation value.

Next, in step S232, the control unit 306 calculates a patch gradation value of the gray axis correction control in the specified print mode based on the CMY initial value information received from the printer controller 302, with a computing program of the input gradation values of an unshown test image for the gray axis correction control. Obviously, this calculation is performed as to each gradation value of the prepared first through eight gradation values.

That is to say, different CMY initial values for each print mode are set taking into consideration the density/gradation property difference between print modes. Therefore, subsequently, the color difference between the chromaticity of the patch of K serving as a target, and the CMY mixed color patch chromaticity can be set within a certain color difference range without employing the inter-print-mode gradation correction table, and accordingly, the estimation precision of the multiple-regression calculation can be improved. Further, the load of multiple-regression calculation can be alleviated. Subsequently, with regard to steps S234 through S236, the same processing in steps S134 through S136 described above should be executed, so detailed description thereof will be omitted here.

The case has been introduced so far wherein the gradation property difference between the respective print modes is taken into consideration, thereby further improving a test image patch employed for the gray axis correction control. However, in the case of the above-mentioned method, the range which can be subjected to gradation correction by the gray axis correction control is shifted to more highlight side than in the plain paper print mode, and the correctable gradation range is restricted in some cases.

In light of such a case, an arrangement should be employed wherein the CMYK initial values are set while taking into consideration the gradation property difference of each print mode (e.g., FIG. 11). Specifically, in each print mode, the CMYK initial values are set from a reproducible range particular to a printer such that, with gradations from low density to high density, the color difference between the chromaticity of a K patch, and the CMY mixed color patch chromaticity, of a test image is included in a certain color difference range. Thus, though there is a restriction such as a reproducible range particular to a printer, in each print mode, more suitable CMYK initial values can be employed, and gray balance can be corrected with a wide range gradation. Moreover, consequently, color adjustment can be performed with high precision.

Also, as further improvement the following is suggested. With the above description, for example, the inter-print-mode gradation correction table 523 in FIG. 17 relates to a black monochrome patch, and correction has been performed so as to obtain the same hue and brightness as in the standard print mode. However, the present invention is not restricted to this.

With regard to a black monochrome patch, an exemplary arrangement may be made wherein regardless of print modes, each patch is formed by employing an input gradation value prepared beforehand for the standard print mode or the like without being modified, and the prediction result obtained by interpolating the detection result thereof is employed. Consequently, with regard to a black monochrome, even if there is the gradation property difference between print modes, change in decompression or compression in the brightness direction occupies a large portion thereof, and change in a hue direction hardly affects change in chromaticity in some cases. Accordingly, based on the patch chromaticity of a black monochrome formed without employing the inter-print-mode gradation correction table 523, the reproduction range (graph) of black on the L*a*b* space can be readily predicted. Subsequently, based on the desired predictive chromaticity for a black monochrome patch, and the chromaticity detection result of a mixed color patch based on the above-mentioned CMY initial values, step S115 in FIG. 5, step S135 in FIG. 16, and step S235 in FIG. 18 are executed, whereby excellent calculation results can be obtained.

Thus, the calculation result of each gradation value of a mixed color patch can be obtained without employing the inter-print-mode gradation correction table 523. Also, the value of the gradation value of black does not have to be held for each of the corrected first gradation value through corrected eighth gradation value in FIGS. 19B and 19C for each print mode, and accordingly, memory use quantity can also be conserved.

<Reflecting Gray Axis Correction Control in Multiple Types of Print Modes>

Description will be made below regarding a method wherein the image forming apparatus having multiple three or more print modes (recording material types) performs the gray axis correction control, accompanying formation and detection of a patch in any type of print mode, to reflect the actual gray axis control results thereof in the other multiple types of print modes.

Now, definition explanation will be made regarding the terms employed for the following description beforehand. First, the "first print mode" is an arbitrary print mode specified by the user or color image forming apparatus, and in this arbitrary print mode, a CMY mixed color patch is actually formed on a sheet, and the gray axis correction control is executed thereupon. Also, "second print mode" is a print mode different from the first print mode (type of recording material), and collectively refers to multiple, i.e., two or more types of print modes. Also, "the gray axis correction control results in the first print mode" means (C0', C1', C2', and so on through Cn') obtained from input values (C0, C1, C2, and so on through Cn) in the first quadrant in FIG. 23. Also, "the gray axis correction control results in the second print mode" means (C0'''h, C1'''h, C2'''h, and so on through Cn'''h) obtained from input gradation values following conversion (C0'', C1'', C2'', and so on through Cn'') of the third quadrant in FIG. 23, or means (C0'''g, C1'''g, C2'''g, and so on through Cn'''g) obtained from input gradation values following conversion (C0'', C1'', C2'', and so on through Cn'') of the third quadrant in FIG. 23. Note that the gray axis correction control results are equivalent to those obtained using the color correction table 150 or mixed correction table 600 described in FIG. 10.

Description will be made regarding the present embodiment with reference to the flowchart in FIG. 20. According to the embodiment of the present invention a printing mode or type of recording material is identified, and gray axis correction control is performed based on the identified printing mode or recording material (S201) and control results are calculated (S202). Subsequently, determination (S204) is made regarding whether or not to predict a value equivalent to the results of the gray axis correction control, for a different printing mode or type of recording material, based on the control results previously obtained (S202). If certain conditions are satisfied, the prediction is carried out (S205) and the results of the prediction are taken as the results of the gray axis correction control for the different printing mode.

Figure 18:
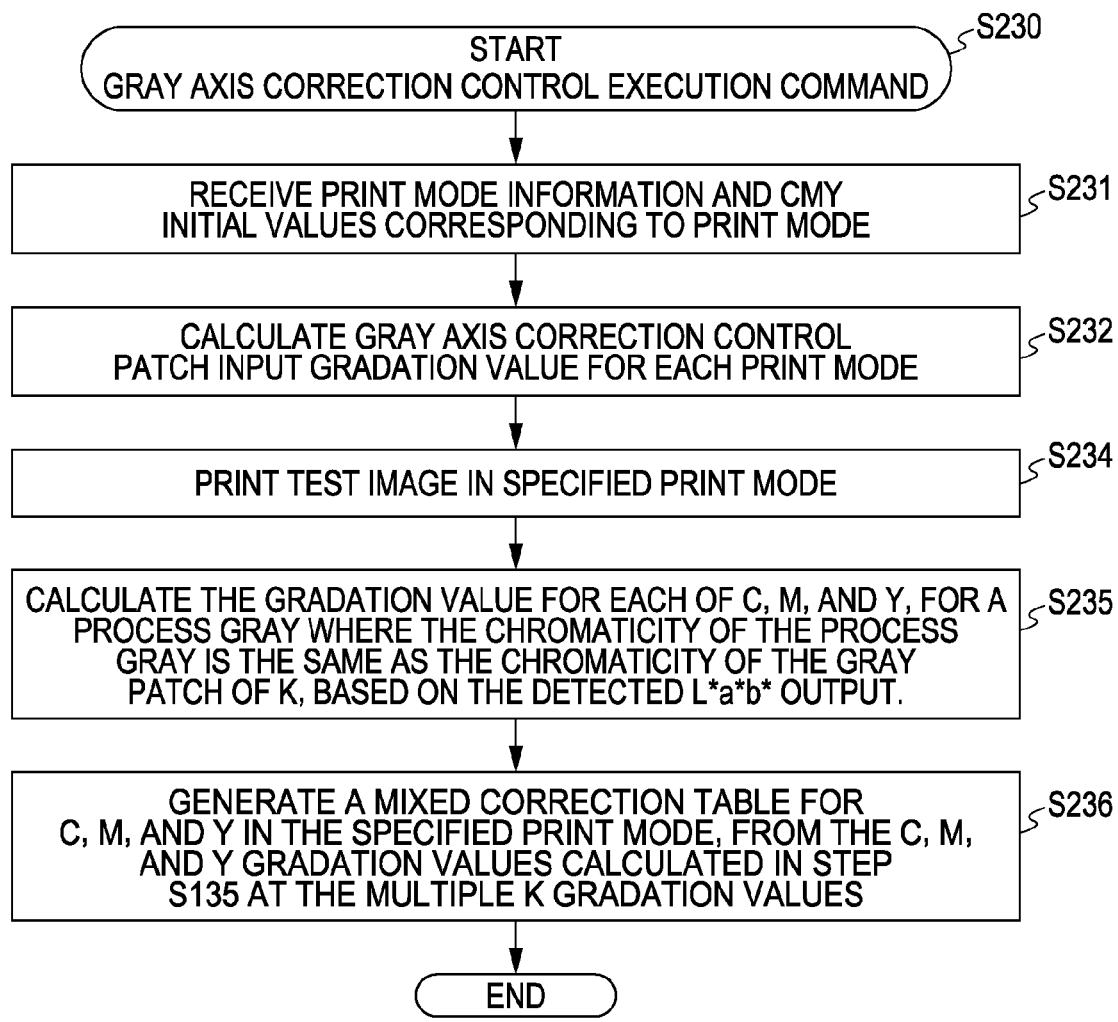
FIG. 18 is an example of a flowchart for executing the gray axis correction control according to the specified print mode.
Figure 20:
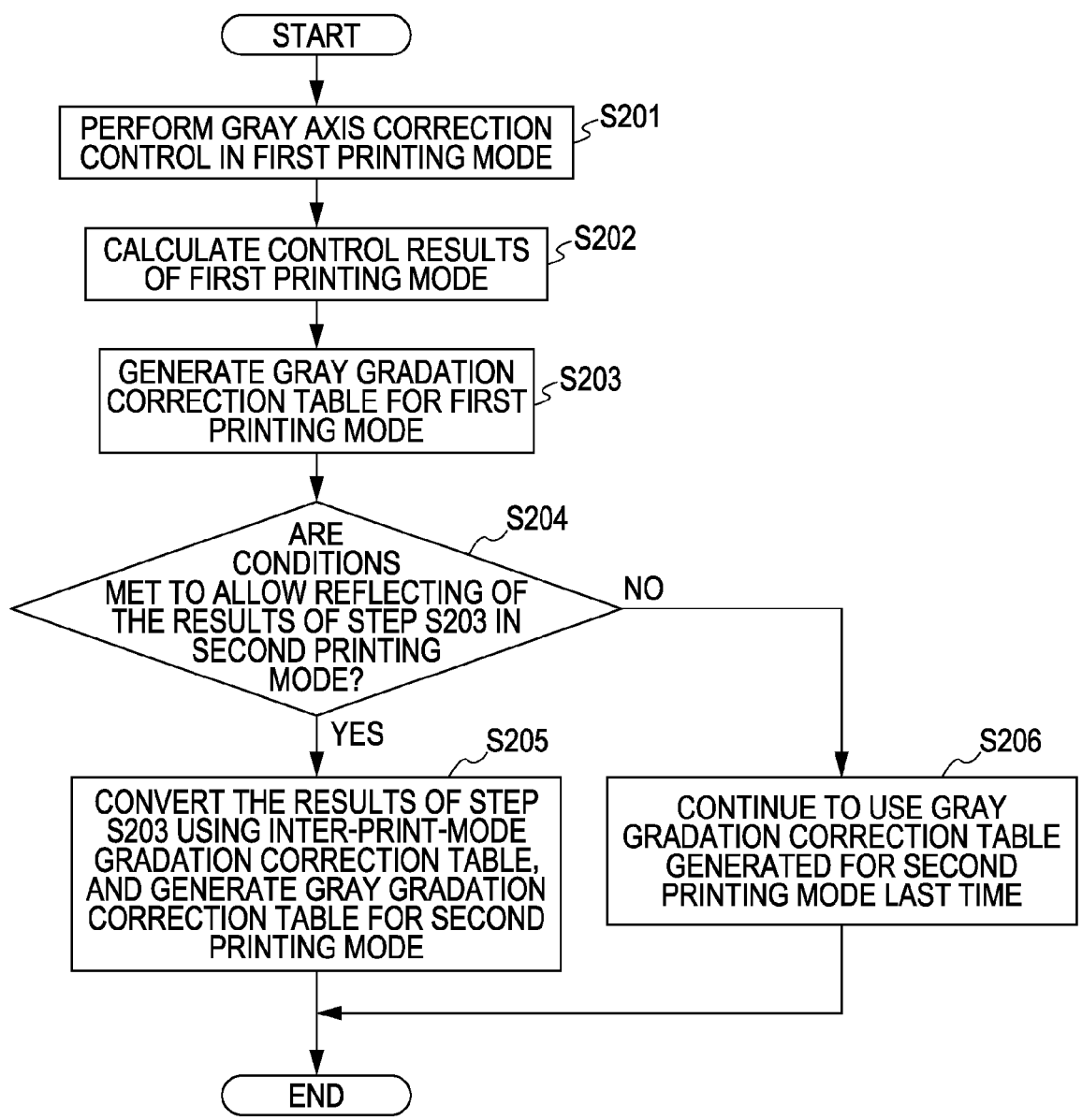
FIG. 20 is a flowchart for executing the gray axis correction control including the corrections of the other print modes other than the specified print mode.

The flowchart in FIG. 20 is equivalent to the flowchart showing the detailed operation in step S136 in FIG. 16 and in step S236 in FIG. 18.

First, in step S201, the control unit 306 executes the gray axis correction control in the first print mode by employing the same method in steps S114 through S117 in FIG. 5.

Subsequently, the control unit 306 calculates the control results in the first print mode (step S202), and calculates the color correction table for the first print mode (step S203).

Subsequently, the control unit 306 determines whether or not the conditions for permitting reflection of the results from step S203 by using the results from step S203 in the second print mode have been satisfied (step S204). Note that the processing in step S204 and thereafter are executed for each of the multiple, i.e., two or more print modes other than the first print mode executed in step S201. According to the processing in step S204, the gray axis correction control results from the print mode wherein the actual measurement accompanying formation and detection of a patch has been actually performed, can be used in each of the other print modes, a point which will be described later in detail. Accordingly, with this usage, there may be a case where the results are applied to multiple print modes, and a case where the results are applied to one print mode alone. In either case, excellent print image quality can be obtained overall in multiple types of print modes, while suppressing both downtime and wasting of consumables.

For example, with an electrophotographic-type color image forming apparatus, in general, there is a case where change in density/gradation in a certain print mode does not emerge markedly in another print mode. In this case, if the gray axis correction control results in the print mode wherein change in density/gradation has been detected always being reflected in another print mode, there is a possibility that a reverse effect will occur. Accordingly, with the color image forming apparatus of the present invention, in a case where the gray axis correction control is carried out in a certain print mode, a determination is made regarding whether or not to reflect the most recent control results, based on the past information, in each print mode.

Note that with reference to the flowchart in FIG. 20, it has been described so far principally to set a gray gradation correction table (color correction table 150), but the mixed color correction table 600 described in FIG. 5 and so forth is set here based on the color correction table set to each print mode. The color correction table corresponding to each print mode is an exact table, so naturally, the mixed color correction table 600 is also an exact table to obtain overall excellent print image quality.

The above-mentioned flowchart in FIG. 20 is executed by the image forming apparatus, whereby gray-balanced excellent print image quality can be obtained in multiple types of print modes while suppressing or reducing both downtime and consumption of consumables.

<Reflecting Conditions>

FIG. 21 shows exemplary conditions for determining whether or not to apply the results obtained in step S203. The information shown in FIG. 21 is stored beforehand in a memory which the control unit 306 of the color image forming apparatus can read.

FIG. 21 shows three exemplary conditions of: 1) the gray axis correction control has never been executed; 2) a certain period of time or more has elapsed since the gray axis correction control was last performed; and 3) a part of the image forming apparatus has been replaced since the gray axis correction control was last performed. The above-mentioned conditions 1 and 2 are determined for each print mode (recording material type).

If none of these conditions are satisfied, in step S206 the previous color correction table created in the second print mode is continuously employed at the time of printing. On the other hand, if any of the above-mentioned conditions are satisfied, step S205 is executed. Specifically, the information of gradation/density property of each color between the standard print mode and each print mode stored in the ROM 310 is employed beforehand, gray axis correction control results for the second print mode are predicted from the gray axis correction control results obtained in the first print mode, thereby creating a color correction table in the print mode thereof. Note that when there are multiple types of second print mode, gray axis correction control results corresponding to the multiple types of print modes are predicted from the gray axis correction control results obtained in the first print mode.

Figure 23:
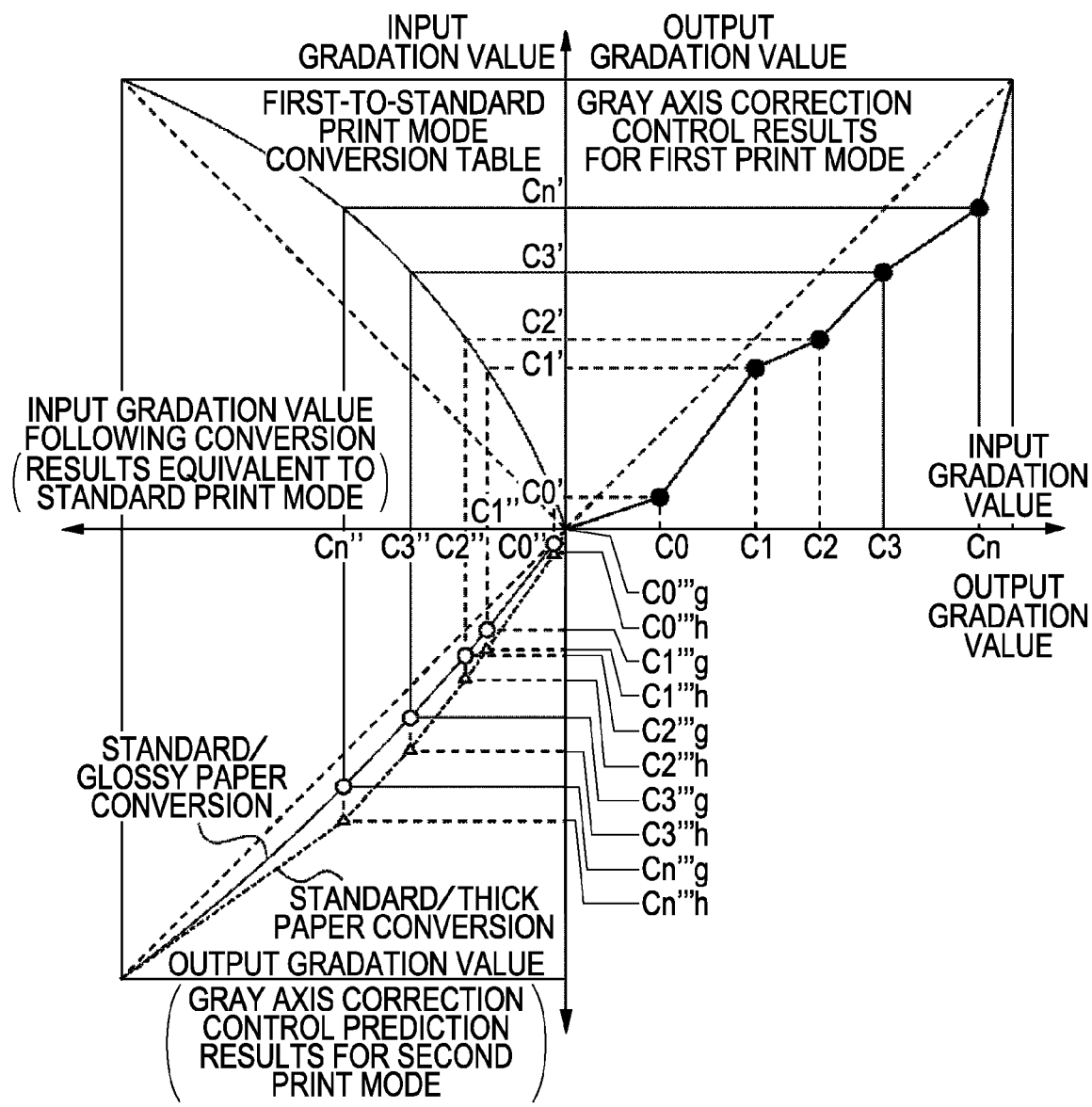
FIG. 23 is a diagram for describing a method for predicting the gray axis correction control results of the other printed modes from the gray axis correction control results of a certain print mode.

FIG. 23 is a graph illustrating a method for predicting gray axis correction control results for the second print mode, from the gray axis correction control results obtained in the first print mode in step S205 of FIG. 20. The "gray gradation correction table" described in steps S205, S206, and so forth of the flowchart corresponds to "color correction table 150 or mixed color correction table 600" described in FIG. 5 and so forth. Let us say that a conversion table equivalent to the graph shown in FIG. 23 has been stored in the ROM 310 beforehand, as described above. The second print mode is, in this case, the glossy paper print mode and thick paper print mode. The gray axis correction control results for the second print mode, (C0'''g, C1'''g, C2'''g, and so on through Cn'''g) and (C0'''h, C1'''h, C2'''h, and so on through Cn'''h) can be obtained as follows. First, in the first quadrant (C0', C1', C2', and so on through Cn') representing the gray axis control results in the first print mode are obtained from input gradations values (C0, C1, C2, and so on through Cn). Next, referring to the second quadrant, one of the print mode control results is temporarily converted into the standard print mode results (C0'', C1'', C2'', and so on through Cn''). The conversion curve employed for this conversion is a table correlated with a gradation value for obtaining the same density in each of the print modes. Subsequently, referring to the third quadrant, the standard print mode results are further converted into the predicted results in the second print mode (C0''', C1''', C2''', and so on through Cn''').

<Description of Detailed Timing Chart>

Description will be made below specifically with reference to FIG. 22. Note that, in the following description, for example, the standard print mode can be made equivalent to the first print mode, and the glossy paper print mode and thick paper print mode can be made equivalent to the second print mode, and so forth.

Figure 22:
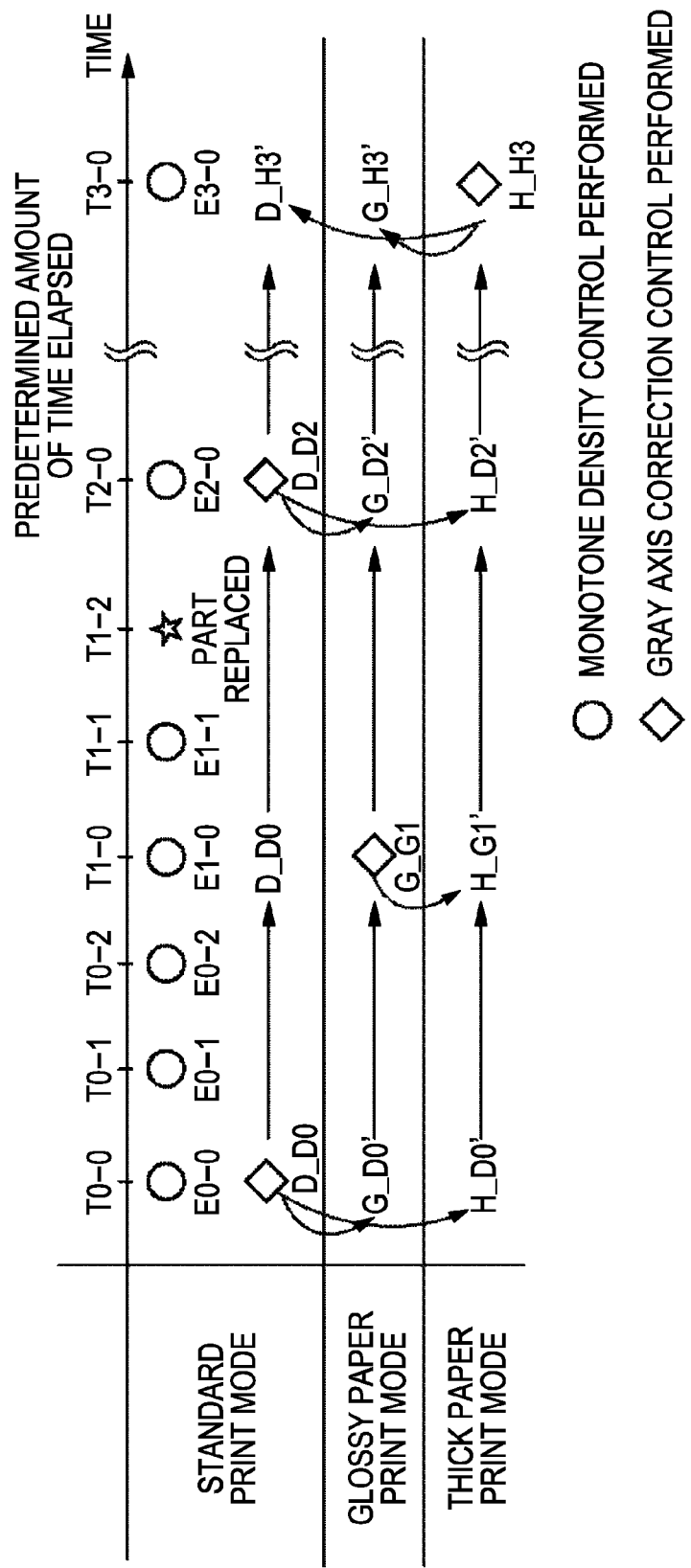
FIG. 22 is a diagram illustrating the sequence of the gray axis correction control including the corrections of the other print modes.

FIG. 22 is an exemplary diagram illustrating, with the horizontal direction as time, times when the monochrome density control was executed, times when the gray axis correction control was executed, and the print modes which were executed.

Note that, in FIG. 22, the circles mean that the monochrome density control was executed, and with the present embodiment, let us say that the monochrome density control corresponds to the standard print mode alone, and is used to create a density correction table for the standard print mode.

The diamonds mean that the gray axis correction control was executed, and in FIG. 22, the position of the mark shows which print mode the gray axis correction control was executed for. Note that in FIG. 22, when the gray axis correction control was actually executed, the monochrome density control was also performed, so that the mixed color control described in FIG. 5 and so forth was in fact performed.

Also, points in time T0-0 through T3-0 in FIG. 22 each indicate the time of the monochrome density control or gray axis correction control being executed taking into account the conditions shown in FIG. 21. Also, printing is being performed, or an image forming apparatus standby state is occurring, between the respective points in time (one of T0-0 through T3-0).

Referring to (1) Point in time T0-0: the monochrome density control and gray axis correction control are executed in the standard print mode A color correction table (D_D0), from the standard print mode, is reflected, as shown in arrows in the drawing, in a color correction table (G_D0') in the glossy paper print mode and reflected in a color correction table (H_D0') in the thick paper print mode by employing the inter-print-mode gradation conversion method from the first through third quadrants in FIG. 23. In this particular example no gray axis correction control was executed in any print mode before the point in time T0-0. At the time of normal print, in the standard print mode, image formation is performed by employing a mixed table obtained by multiplying the color correction table D_D0 and a density correction table E0-0 created by the monochrome density control executed most recently. In a case where normal print is performed in the glossy paper print mode, image formation is performed by employing a mixed table obtained by multiplying G_D0' with E0-0.

Referring to (2) Points in time T0-1 and T0-2: the monochrome density control alone is executed in the standard print mode.

In this case, the density correction table (E0-1) is updated, and the mixed table in each print mode is also updated.

Referring to (3) Point in time T1-0: the monochrome density is performed in the standard print mode, and the gray axis correction control is performed in the glossy paper print mode.

In this case, in accordance with the condition determination in step S204 in FIG. 20, the color correction table (H_G1') is updated in the thick paper print mode alone, in which mode the gray axis correction control has never been executed in the past. Specifically, the color correction curve (H_G1') in the thick paper print mode is updated based on the color correction table (G_G1) in the glossy paper print mode, and the inter-print-mode gradation correction table.

Referring to (4) Point in time T1-2: part replacement

A part which might influence image formation, such as the cartridge, intermediate transfer belt, fixer, and so forth, is replaced. Note that part replacement detection is performed by an unshown part replacement detecting unit.

(5) Point in time T2-0: the monochrome density control and gray axis correction control are performed in the standard print mode In this case, in accordance with the condition determination in step S204 in FIG. 20, a part of the image forming apparatus has been replaced, so in the same way as with the point in time T0-0, the color correction table (D_D2) in the standard print mode is reflected in the other print modes by employing the inter-print-mode gradation correction table. Specifically, as shown in arrows in the drawing, the color correction table (D_D2) in the standard print mode is reflected in the color correction table (G_D2') in the glossy paper print mode, and reflected in the color correction table (H_D2') in the thick paper print mode. This is equivalent to a case where the third condition in FIG. 21 is satisfied. Note that, in FIG. 22, in the case where part replacement has been detected, the color correction table in the standard print mode is reflected in all of the modes by employing the inter-print-mode gradation correction table, but in another example, the color correction table in the standard print mode may be reflected in multiple print modes as long as they are not exceptional print modes.

(6) Point in time T3-0: the monochrome density control is performed in the standard print mode, and the gray axis correction control is performed in the thick paper print mode In this case, as shown in FIG. 22, a certain period of time has elapsed since the point in time T2-0, so in accordance with the condition determination in step S204 in FIG. 20, a gray axis correction control execution history carried out in the past is temporarily reset by the control unit 306. Subsequently, the results of the gray axis correction control (H_H3) executed in the thick paper print mode is reflected in the color correction table (D_H3') in the standard print mode, and reflected in the color correction table (G_H3') in the glossy paper print mode.

Thus, according to the timing chart in FIG. 22, in a case where there are three or more print modes (first, second, and third), and in a case where in the first print mode a patch formed on a recording material is detected to perform image forming condition setting, this may be reflected in the second and third modes. Also, in a case where in the third print mode a patch formed on a recording material is detected to perform image forming condition setting, this may be reflected in the first and second modes. Also, similarly, in a case where in the second print mode a patch formed on a recording material is detected to perform image forming condition setting, this may be reflected in the first and third modes. Note that the image forming condition setting mentioned here means correction, generation, or adjustment of image forming conditions. Thus, even if the gray axis correction control is performed in any print mode, excellent print image quality can be obtained in multiple types of print modes while suppressing both downtime and consumption of consumables.

As described above, with the first embodiment, in a case where the gray axis correction control is performed in a certain print mode, determination is made based on past information whether or not to apply the most recently obtained control results to each print mode. Subsequently, only in the case where an application condition is met, are gray axis correction control results for another print mode (corresponding to the second media) predicted based on the gray axis correction control results in the first print mode (corresponding to the first media). Control according to such a method enables excellent print image quality to be obtained constantly even when multiple types of recording materials are used while suppressing downtime and consumption of consumables.

A second exemplary embodiment will be described below. With the first embodiment, description has been made regarding the gray axis correction control. However, in a case where a test image (patch) is formed on a recording material, the present invention is not restricted to the gray axis correction control. With the present embodiment, let us say that the patches detected by the color sensor 10 are each monochrome patches of cyan, magenta, yellow, and black respectively, and the tone curve of each monochrome patch is corrected. Description will now be made regarding color sensor control for detecting a monochrome patch after fixing to perform processing based on the detected patch. Hereafter, the color correction control according to the present embodiment will be abbreviated as monochrome color sensor control. In the present embodiment, the chromaticity of each monochrome color patch is detected, and the color patch of each monochrome is corrected, but as compared to the conventional monochrome density control for detecting an unfixed toner image on the intermediate transfer belt, which has been known, the color sensor control is advantageous in that color fluctuation after transfer can be corrected.

Also, as for conditions for determining whether or not to predict the results in the other multiple print modes from the color sensor control results (computation results) in a certain print mode (first print mode), more detailed examples than those in the first embodiment will be described.

Description will be made regarding the present embodiment with reference to the flowchart in FIG. 24. FIG. 24 illustrates the detailed operation in step S136 in FIG. 16 and in step S236 in FIG. 18 in the case of the monochrome color sensor control. Also, as with the above-mentioned embodiment, let us say that the "first print mode" is a specified arbitrary print mode, and multiple print modes different from the first print mode are the "second print mode".

First, in step S2401, the control unit 306 determines whether or not a mode wherein the color sensor control is executed automatically is ON. In a case where this color sensing automatic mode is ON, the control unit 306 performs processing in accordance with whether automatic execution conditions have been met, or a user execution instruction has been received, which will be subsequently described in steps S2402 and S2404. Specifically, the control unit 306 executes monochrome color sensor control, or performs nothing in a standby state of the image forming apparatus, and ends the flow processing.

On the other hand, in a case where the color sensing automatic mode is OFF, the control unit 306 performs processing in step S2403 in accordance with whether or not the user's execution instruction has been received. In a case where YES is determined in step S2403, the control unit 306 executes the monochrome color sensor control. On the other hand, in a case where NO is determined in step S2403, the control unit 306 proceeds to a standby state of the image forming apparatus.

The processing of each step from steps S2401 to S2404 means as follows. Setting the color sensing automatic mode to ON means that excellent print image quality is constantly obtained for all of the print modes. Alternatively, if the user desires, the user may only instruct the color sensor to turn ON at a particular time or times. Such an operation mode, where the color sensing automatic mode is OFF and the user instructs the color sensor to turn on at a particular time or times, has the advantage compared to the automatic color sensing mode that recording materials are consumed only in the case of the user desiring. That is to say, the optimal gradation correction control can be provided according to the usage of the user employing the image forming apparatus, and the tolerance of desired print image quality.

Note that description has been made so far regarding steps S2401 through S2404 with the control unit 306 acting primarily, but this processing may be performed by the printer controller 302 in FIG. 2. In this case, let us say that the control unit 306 is informed of processing results by the printer controller 302.

In step S2405, the control unit 306 determines in which print mode to perform the monochrome color sensor control. Description will be made below in detail regarding the determining method thereof by classifying this into the following (i) and (ii), i.e., when the automatic mode is ON, and when the automatic mode is OFF.

(i) Case when the color sensing automatic mode is ON

In a case where the color sensing automatic mode is ON, the control unit 306 automatically determines which recording materials, from the paper feed trays 80, are to be employed for the monochrome color sensor control in accordance with the following priority order.

Priority order 1: recording materials of which the paper size in the conveying direction is great are selected. For example, in a case where there are an A4 landscape size (the length in the conveying direction is 210 mm) and an A3 portrait size (the length in the conveying direction is 420 mm) in the paper feed trays, in this priority order the recording materials of the A3 portrait size are selected. The greater the paper size in the conveying direction is, the more test images can be formed per one sheet, consequently quantity of the recording materials necessary for one-time control can be reduced. Subsequently, the print mode corresponding to the type of the recording material of the selected paper size is determined, and is set as the first print mode (step S2405 in FIG. 24).

Priority order 2: with the determination in Priority order 1, for example, in a case where the recording material sizes to be loaded into all of the paper feed trays are the same, the determination in Priority order 2 is performed. Recording materials are selected based on the cost per unit of the recording material from low to high, where the cost per unit is stored beforehand. In the present embodiment, in accordance with a recording material table stored in the RAM 310, recording materials are selected in the order of the plain paper print mode, thick paper print mode, and glossy paper print mode. Alternatively, the printer controller 302 determines a print mode directly in accordance with the print settings of a job, or from the type of recording material set in the specified paper feed tray, and sets this as the first print mode (step S2405 in FIG. 24).

Note that an arrangement is made wherein the priority order relating to selection of recording material at the time of the color sensing automatic mode being ON can be changed by a user using for example, a driver setting screen of a PC (not shown) or the operation panel 303 (not shown) of the image forming apparatus, according to the user's requirements.

(ii) Case when the color sensing automatic mode is OFF

On the other hand, in a case where the color sensing automatic mode is OFF, the monochrome color sensor control is performed by employing the user's desired timing and recording materials. When a monochrome color sensor control execution command is received from a user, the control unit 306 or printer controller 302 prompts the user to insert the recording materials in the print mode as specified by the user using display control or the like of the driver setting screen of a PC (not shown) or the operation panel 303 of the image forming apparatus (not shown).

Subsequently, the control unit 306 sets N print modes wherein the monochrome color sensor control has not been executed, to the second print mode (step S2406).

In step S2407, under the control of the control unit 306, the monochrome color sensor control is actually performed in the first print mode determined in step S2405, and in step S2408 the control results thereof are calculated. Subsequently, in step S2409, a gradation correction table in the first print mode is generated, and color correction in this mode is completed.

In step S2410, under the control of the control unit 306, based on the difference between the gradation/density property information for each color in the standard print mode and each print mode stored beforehand in the ROM 310, the monochrome color sensor control results in the first print mode are converted into standard print mode results. This conversion table is a table wherein gradation values for obtaining the same density in each print mode are correlated. Also, similarly to this table, multiple tables may be prepared according to the use environment of the image forming apparatus, and usage of consumables. This conversion is performed in the same manner as described in the first embodiment, so a detailed description thereof will be omitted.

In step S2411, under the control of the control unit 306, in accordance with the information in FIGS. 25 and 26, a determination is made regarding whether or not to perform image forming condition setting, based on the patch detection result in the print mode in which the actual measurement has been performed, in each of multiple types of print modes other than the print mode wherein the actual measurement has been performed.

Subsequently, the processing in steps S2412 through S2414 is repeated regarding all of the N second print modes set in step S2405.

According to the processing in steps S2411 through S2415, determination is made regarding whether or not to reflect the correction results based on the patch detection result, in the type of print mode wherein the actual measurement has been performed, in each of the multiple types of print modes (second print mode) other than the print mode type wherein the actual measurement has been performed.

Subsequently, in a case where reflection of the actual measurement results by the control unit 306 has been completed in all of the second print modes, i.e., all of the print modes other than the print mode wherein the monochrome color sensor control has been performed, the flow ends.

Reflecting Conditions

Next, step S2412 will be described more specifically. Step S2412 is a step for determining whether or not to reflect the results obtained in step S2410 derived from the first print mode control results in a certain print mode I which is the second print mode. The determination conditions thereof will be shown in FIG. 25. Note that the information shown in FIG. 25 is stored in the ROM 310 beforehand. Subsequently, the control unit 306 performs the determination processing.

In the present embodiment, there are principally two conditions, as shown in FIG. 25A.

1. A case where the monochrome color sensor control has never been executed in the past 2. A case where there has been a predetermined change in the state of the image forming apparatus since the previous monochrome color sensor control.

Here, there are multiple conditions in the case where there is change in the state of the image forming apparatus in Condition 2, and examples thereof will be shown in FIG. 25B. Any condition thereof reflects a situation where the density/gradation property of a common electrophotographic-type color image forming apparatus may change. Subsequently, in a case where at least one of these conditions is satisfied, the results of the monochrome color sensor control are reflected in another print mode. With the color image forming apparatus according to the present embodiment, the thresholds of each condition are as shown in FIG. 26B.

Condition 2-1 is a case wherein at least one of a temperature sensor (not shown) and a humidity sensor (not shown), included in the image forming apparatus, detect a change greater than or equal to a predetermined value since the monochrome color sensor control was last performed. In general, with an electrophotographic-type color image forming apparatus, upon at least one of temperature and humidity changing, a physical quantity of the toner such as charge quantity or fluidity or the like changes. Also, electric resistance of as a sponge roller and so forth, making up the color image forming apparatus, may change. As a result thereof, it has been known that the density/gradation property on a recording material changes. According to FIG. 26B, in a case where the temperature change since the last control is ±10° C. or greater in the print mode I (I in step S2411 in FIG. 24), the control results in the first print mode are reflected.

Condition 2-2 is a case where at least one of: the number of sheets of recording material printed; usage of consumables; and time elapsed, exceeds a predetermined threshold. This condition is equivalent to a case where a determination is made that the reliability of the most recent control results in each print mode executed has deteriorated. According to FIG. 26B, in the print mode I, the control results in the first print mode are reflected when one or more of the following exemplary thresholds are breached: change in the number of sheets printed since the last control is 2000 sheets or greater; the change in the usage of consumables is 18% or greater; and the time elapsed is 18 hours or greater. Here, with regard to the number printed, for example, A4 size is determined to be a stipulated paper size, and in a case where sheets other than A4 size are loaded, the value of A4 size conversion is counted. Also, consumables correspond to the toner cartridge of each color, intermediate transfer belt, secondary transfer roller, and fixing roller.

Condition 2-3 is a case where the resistance detection results of recording sheets or transfer materials exceed a predetermined threshold. This condition is equivalent to a case where a determination is made that the reliability of the most recent control results executed in each print mode has deteriorated, as with Condition 2-2. According to FIG. 26B, in the print mode I, in a case where change in sheet resistance since the last control is ±5% or greater, and/or the change in transfer member resistance is 18% or greater, the control results in the first print mode are reflected.

Condition 2-4 is a case where part replacement has been detected. This condition has a higher possibility that the density/gradation property has consequently changed compared to Conditions 2-1 through 2-3 because a part making up the color image forming apparatus has been changed since the last control. In the print mode I, in a case where part replacement has been performed since the last control, regardless of the change in the state of the image forming apparatus in each print mode managed with the management table (FIG. 26A), the color correction tables in the other multiple types of print modes are corrected (adjusted) based on the control results in the first print mode. Note that the corresponding replacement parts include the toner cartridge of each color, intermediate transfer belt, secondary transfer roller, and fixing roller. Thus, in a case where part replacement has not been detected the monochrome color sensor control results are reflected to each print mode, in dependence on the thresholds managed for each print mode. In the present case, where part replacement has been detected, the monochrome color sensor control results are reflected in the multiple types of print modes collectively.

Condition 2-5 is a case where the density sensor or color sensor detect a change which exceeds a predetermined threshold. This condition employs the results obtained by the density sensor or color sensor which directly detect the feature quantity of a test image formed in the same print mode I, and unlike Conditions 2-1 through 2-4, a change in the density/gradation property can be detected with certainty. As for a method for monitoring change in density since the last control, for example, there is a method wherein a test image is formed in a non-image region of an output image, and this is measured for each page.

Determination of the above-mentioned conditions has to be made for each of all of the print modes which the color image forming apparatus of the present invention can recognize. Therefore, in order to determine the conditions of all of the print modes, the management table for each print mode loaded from nonvolatile memory is stored in the RAM 309. Specifically, description will be made with reference to FIG. 26A. FIG. 26A is the management table for each print mode and is used to determine whether or not to reflect the monochrome color sensor control results obtained in a certain print mode in another print mode. Print modes 1, 2, and 3 denoted by 1311 through 1313 are disposed in the vertical direction, and the change factors 2601 through 2610 in the state of the image forming apparatus, such as time elapsed 2601 since the last execution of the monochrome color sensor control, described in FIG. 25, are disposed in the horizontal direction.

Now, let us say that the management table at a certain point in time is FIG. 26A, and the monochrome color sensor control has been performed in the print mode I. In this case, as described above, the conditions and thresholds in FIGS. 25A, 25B and 26B are referenced, and as a result thereof, the monochrome color sensor control results employing the results in the print mode 1 (the results in the standard print mode in step S2410) are only reflected in the print mode 2 (proceeds to step S2413). Here, in a case where the results in the first print mode (print mode 1 in this case) are not reflected, the results executed in the print mode I the last time are used continuously, and the flow proceeds to step S2415.

Step S2413, the control unit 306 employs the data converted from the monochrome color sensor control results into the results in the standard print mode in step S2410 beforehand to convert into the results in each print mode through a standard-to-print mode conversion table stored for each print mode. The third quadrant in FIG. 23 illustrates a situation in which different conversion tables are employed between the glossy paper print mode and thick paper print mode to convert into the results in each in print mode. Specifically, the standard print mode conversion results converted in step S2410 (C0", C1", C2", and so on through Cn") is converted into the second print mode results (C0''', C1''', C2''', and so on through Cn'''). The glossy paper print mode results become (C0'''g, C1'''g, C2'''g, and so on through Cn'''g), and the thick paper print mode results become (C0'''h, C1'''h, C2'''h, and so on through Cn'''h). Note that, with regard to the conversion table, conversion is performed in the same way as described in FIG. 23, so detailed description thereof will be omitted here.

Now, description will be made regarding the reason why the standard-to-glossy paper conversion reduces output gradation values as compared to the standard-to-thick paper conversion. This is because the glossy paper print mode delays fixing speed to increase image glossiness as compared to the thick paper print mode, thereby increasing the dot gain of a toner image generally, and accordingly, the density even with the same image data becomes denser. Therefore, in a case where the same image data are input, in order to obtain the same density as with the thick paper print mode, the image data has to be converted into a smaller value at the time of image data conversion from the standard print mode.

In step S2414, the control unit 306 employs the monochrome color sensor control predictive results in each print mode obtained in step S2413 to correct the gradation/density table. This method is the same method described in the previous embodiment, so detailed description thereof will be omitted.

The flow of the present embodiment which has been described so far is ended here. With the present embodiment, a table is stored, which manages change occurring since the monochrome color sensor control was last performed, in real time for each print mode, and determination is made based on this table whether to employ certain print mode results. Accordingly, with the reflection, there are a case where reflection as to multiple print modes is performed, and a case where reflection as to only one print mode. In either case, overall excellent print image quality in multiple types of print modes can be obtained while reducing both downtime and consumption of consumables.

A third exemplary embodiment will be described below. With the above-mentioned embodiments, description has been made wherein the type of recording material is determined indirectly based on the print mode information instructed from the printer controller 302, and the processing in step S133 and thereafter in FIG. 16 is executed. However, the present invention is not restricted to this mode.

An arrangement may be made wherein information indicating the type of recording material is detected directly, the above-mentioned respective embodiments subsequently being performed based on the detection results. At this time, the type of recording material to be fed is detected by the recording material sensor 70 shown in FIG. 1, the type of recording material is determined based on the detection result thereof, and the determined recording material type is made to correspond to the standard print mode and glossy paper print mode in the first embodiment. In this case, if the recording material type is determined to be plain paper by the recording material sensor 70, the print mode thereof can be regarded as the standard print mode, and if the recording material type is determined to be glossy paper, the print mode thereof can be regarded as the glossy paper print mode. Following determination of the print mode, the same processing as the processing described in the above-mentioned respective embodiments should be executed. The detailed description thereof will be omitted here.

A fourth exemplary embodiment will be described below. In step S2412 in FIG. 24 in the second embodiment, as compared to the case of step S204 in FIG. 20 in the first embodiment, description has been made in more detail regarding the determination that is made whether to reflect the gray axis correction control results obtained in the first print mode in each of the other multiple print modes.

The determination processing in step S2412 in FIG. 24 in the second embodiment is based on the information in FIGS. 25A, 25B, 26A, and 26B, but if these reflection conditions are applied to step S204 in FIG. 20, the processing in the flowchart in FIG. 21 can be changed to more delicate control.

Also, with the description in FIG. 21 in the first embodiment, though the management table equivalent to FIG. 26A described in the second embodiment has to be described in more detail, let us say that, with the first embodiment as well, the same management table (storage unit) as with FIG. 26A is provided.

Also, the threshold of each condition in FIG. 26B can also be employed as a determination reference for determining YES in step S204 in FIG. 20.

With the determination processing in step S204 of the flowchart in FIG. 20, for example, the control unit 306 references the time elapsed (h) of reference numeral 2601 in FIG. 26A, and the condition information in FIG. 26B to determine whether or not to reflect the actual measured gray axis correction control results in each print mode.

A fifth exemplary embodiment will be described below. With the above-mentioned respective embodiments, description has been made wherein image forming conditions relating to colors, such as the density correction, color correction, mixed color correction, or the like, are set based on the detection results of various types of patch. However, the present invention can be applied to other image forming conditions, and can be applied to various image forming conditions, for example, such as the fixing temperature of the fixer 61, transfer bias at the time of toner transfer, charge voltage as to the photosensitive drum, or the like.

A sixth exemplary embodiment will be described below. Description has been made above regarding the case where a patch is formed on a recording material in a certain type of print mode (recording material), and based on this detection result, the correction table in the certain type of print mode (correction table in FIG. 20 or correction table in FIG. 24) is reflected in the other types of multiple print modes. However, the present invention is not restricted to this.

For example, to describe FIG. 23 as an example, the detection result of a patch in a certain type of print mode (measured plot points in the first quadrant in FIG. 23) may be corrected and used as the detection result in another type of each print mode. With regard to correction of measured plot points, for example, in the case of conceiving correction conversion from the standard print mode (plain paper) to the glossy paper print mode (glossy paper), there is a method for adding or subtracting a conversion correction value ($\alpha$) to/from the measured plot points obtained in the standard print mode. Also, there is a method for multiplying the measured plot points obtained in the standard print mode by a conversion correction value ($\beta$). This calculation is performed by the control unit 306, and is not restricted to between the standard print mode and glossy paper print mode, but is performed between various print modes. That is, a plurality of the above-mentioned $\alpha$ and $\beta$ are stored for each of combinations of print modes beforehand. That is to say, gray axis correction control results (color correction table) in one or more other types of print mode are set based on the detection result after the correction thereof, whereby the same advantages as the above-mentioned respective embodiments can be obtained.

Thus, with the present invention, an arrangement may be made wherein a patch is formed on a recording material in a certain type of print mode of multiple types of print modes, and image forming conditions of multiple types of print modes other than the certain type of print mode are set based on the detection result of the formed patch. As described above, according to the above-mentioned respective embodiments, an advantage can be obtained wherein excellent print image quality can be obtained in multiple types of print modes while reducing both downtime and consumption of consumables.

A seventh exemplary embodiment will be described below. With the above-mentioned respective embodiments, description has been made such that each type of recording material (e.g., plain paper, thick paper, thin paper, and glossy paper) is made to correspond to each print mode regarding surface property. With regard to correspondence between each print mode and the type of recording material, multiple types of recording materials may correspond to one print mode. For example, with regard to glossy paper, in a case where there are various types of glossy paper, an arrangement may be made wherein glossy paper included in a certain whiteness range is classified as glossy paper 1, and this classification is made to correspond to a certain type of print mode.

An eighth exemplary embodiment will be described below. With the above-mentioned respective embodiments, as described in FIG. 10, description has been made so far assuming that the mixed correction table 600 is created, but the present invention is not restricted to this. The same advantages are obtained even in a case where image forming condition setting is performed with gray axis correction control alone.

Another exemplary embodiment will be described below. An arrangement is also included in the scope of the present invention wherein a computer readable program such as a software program code is supplied to a computer within a device or system connected to various types of devices to realize the functions of the above-mentioned embodiments. Also, an arrangement is also included in the scope of the present invention wherein various types of devices are operated in accordance with the program stored in the computer (CPU or MPU) of the system or device, thereby realizing the functions of the above-mentioned embodiments.

Also, in this case, on execution by a computer the computer-readable program causes the computer to implement the functions of the above-mentioned embodiments. The computer-readable code may be supplied via a carrier medium such as a signal or a computer-readable storage medium. Subsequently, the program code itself, and a unit for supplying the program code to the computer, e.g., a recording material storing such program code make up the present invention. As for a computer-readable storage medium which stores such program code, for example, a flexible disk, hard disk, optical disc, magneto-optical disk, CD-ROM, magnetic tape, nonvolatile memory card, ROM, DVD, or the like may be employed.

Also, in a case where the functions of the above-mentioned embodiments are realized by program code collaborating with an OS (Operating System) running on the computer or another application software or the like, such program code is included in the embodiments of the present invention.

Further, it goes without saying that the present invention includes a case where the supplied program code is stored in memory included in a function expansion board in the computer or function expansion unit connected to the computer, and a CPU or the like included in the function expansion board or function expansion unit thereof executes part or all of the actual processing based on the instructions of the program code thereof, thereby realizing the functions of the above-mentioned embodiments.

Note that the above-mentioned respective embodiments simply show specific examples at the time of implementing the present invention, and the technical scope of the present invention is not to be interpreted thereby in a restrictive manner. That is to say, the present invention can be implemented in various forms without departing from the technical idea or principal features thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-098272 filed Apr. 4, 2008, which is hereby incorporated by reference herein in its entirety.

What is claimed is:

1. An image forming apparatus including a forming unit configured to perform image formation according to one of a plurality of image forming modes including first and second image forming modes, and capable of forming a patch on a recording material by using the forming unit, the image forming apparatus comprising:
    a detector configured to detect the patch formed on the recording material by the forming unit; and
    a setting unit configured to set, based on a detection result by the detector, an image forming condition for the forming unit to perform the image formation,
    wherein the forming unit forms, as the patch, a plurality of mixed color patches, in each of which a plurality of colors is mixed, and a black monotone patch,
    wherein the detector detects the plurality of mixed color patches formed by the forming unit to provide output values of the plurality of mixed color patches, and detects the black monotone patch formed by the forming unit to provide an output value of the black monotone patch,
    wherein a relationship between the output values of the plurality of mixed color patches and the output value of the black monotone patch that are provided as detection results by the detector is such that the output value of the black monotone patch is within an area defined by the output values of the plurality of mixed color patches,
    wherein, in a first image forming mode in which an image is formed on a first recording material, the forming unit forms the plurality of mixed color patches based on a plurality of pieces of mixed color patch data,
    wherein, in a second image forming mode in which an image is formed on a second recording material different from the first recording material, the forming unit forms the plurality of mixed color patches based on a plurality of pieces of corrected mixed color patch data obtained by correcting the plurality of pieces of mixed color patch data according to the second recording material, and
    wherein, in both the first image forming mode and the second image forming mode, the relationship between the output values of the plurality of mixed color patches and the output value of the black monotone patch that are provided as the detection results by the detector is such that the output value of the black monotone patch is within the area defined by the output values of the plurality of mixed color patches.

2. The image forming apparatus according to claim 1, further comprising a determination unit configured to determine whether to set the image forming condition by using the setting unit,
    wherein, in a case where the forming unit forms the plurality of mixed color patches and the black monotone patch in the first image forming mode, the determination unit determines whether to set the second image forming condition for the second image forming mode, wherein, if the determination unit determines not to set the second image forming condition for the second image forming mode, the setting unit does not set the second image forming condition for the second image forming mode based on detection results of the plurality of mixed color patches and the black monotone patch formed in the first image forming mode, and wherein, if the determination unit determines to set the second image forming condition for the second image forming mode, the setting unit sets the second image forming condition for the second image forming mode based on the detection results of the plurality of mixed color patches and the black monotone patch formed in the first image forming mode.

3. The image forming apparatus according to claim 1, wherein the first image forming mode and the second image forming mode correspond to different types of media classified according to a surface property thereof.

4. The image forming apparatus according to claim 1, wherein the detector is configured to detect the plurality of mixed color patches formed on the recording material before the recording material is ejected and stacked.

5. The image forming apparatus according to claim 1, wherein the detector detects chromaticity as the detection results of the plurality of mixed color patches and the detection result of the black monotone patch.

6. An image forming apparatus including a forming unit configured to perform image formation according to one of a plurality of image forming modes including first and second image forming modes, and capable of forming a patch on a recording material by using the forming unit, the image forming apparatus comprising:
- a detector configured to detect the patch formed on the recording material by the forming unit;
- a setting unit configured to set, based on a detection result by the detector, an image forming condition for the forming unit to perform the image formation; and
- a determination unit configured to determine whether to set the image forming condition by using the setting unit,
- wherein the forming unit forms, as the patch, a plurality of mixed color patches, in each of which a plurality of colors is mixed, and a black monotone patch,
- wherein the detector detects the plurality of mixed color patches formed by the forming unit to provide output values of the plurality of mixed color patches, and detects the black monotone patch formed by the forming unit to provide an output value of the black monotone patch,
- wherein a relationship between the output values of the plurality of mixed color patches and the output value of the black monotone patch that are provided as detection results by the detector is such that the output value of the black monotone patch is within an area defined by the output values of the plurality of mixed color patches,
- wherein the setting unit is capable of setting a first image forming condition for a first image forming mode in which an image is formed on a first recording material, and setting a second image forming condition for a second image forming mode in which an image is formed on a second recording material different from the first recording material,
- wherein, in a case where the forming unit forms the plurality of mixed color patches and the black monotone patch in the first image forming mode, the determination unit determines whether to set the second image forming condition for the second image forming mode,
- wherein, if the determination unit determines not to set the second image forming condition for the second image forming mode, the setting unit does not set the second image forming condition for the second image forming mode based on detection results of the plurality of mixed color patches and the black monotone patch formed in the first image forming mode,
- wherein, if the determination unit determines to set the second image forming condition for the second image forming mode, the setting unit sets the second image forming condition for the second image forming mode based on the detection results of the plurality of mixed color patches and the black monotone patch formed in the first image forming mode,
- wherein the forming unit changes a combination of respective gradation values of the plurality of colors to form the plurality of mixed color patches based on the change,
- wherein the detector detects chromaticity of the plurality of mixed color patches after the plurality of mixed color patches have been formed on the recording material by the forming unit and fixed on the recording material,
- wherein the setting unit obtains the respective gradation values of the plurality of colors in the plurality of mixed color patches such that the chromaticity of the plurality of mixed color patches detected by the detector come closer to the chromaticity of the black monotone patch, and
- wherein the forming unit forms the plurality of mixed color patches by a first combination of the respective gradation values in the case of the first image forming mode, and forms the plurality of mixed color patches by a second combination of the respective gradation values in the case of the second image forming mode.

7. The image forming apparatus according to claim 6, wherein the setting unit is further capable of setting a third image forming condition for a third image forming mode in which an image is formed on a third recording material different from the first recording material and the second recording material,
- wherein in a case where the forming unit forms the plurality of mixed color patches and the black monotone patch in the first image forming mode, the determination unit determines whether to set the second image forming condition for the second image forming mode and the third image forming condition for the third image forming mode,
- wherein, if the determination unit determines not to set the second image forming condition for the second image forming mode and the third image forming condition for the third image forming mode, the setting unit does not set the second image forming condition for the second image forming mode and the third image forming condition for the third image forming mode based on detection results of the plurality of mixed color patches and the black monotone patch formed in the first image forming mode, and
- wherein, if the determination unit determines to set the second image forming condition for the second image forming mode and the third image forming condition for the third image forming mode, the setting unit sets the second image forming condition for the second image forming mode and the third image forming condition for the third image forming mode based on the detection results of the plurality of mixed color patches and the black monotone patch formed in the first image forming mode.

8. The image forming apparatus according to claim 6, wherein the setting unit obtains the respective gradation values of the plurality of colors in the plurality of mixed color patches such that the chromaticity of the plurality of mixed color patches detected by the detector is identical to the chromaticity of the black monotone patch.

9. The image forming apparatus according to claim 6, wherein the first image forming mode and the second image forming mode correspond to different types of media classified according to a surface property thereof.

10. The image forming apparatus according to claim 6, wherein, in a case where the setting unit does not set the second image forming condition for the second image forming mode based on the detection results of the plurality of mixed color patches and the black monotone patch formed in the first image forming mode, the setting unit maintains an image forming condition that has been previously set for the second image forming mode.

11. The image forming apparatus according to claim 6, wherein the detector is configured to detect the plurality of mixed color patches formed on the recording material before the recording material is ejected and stacked.

12. The image forming apparatus according to claim 6, wherein the detector detects chromaticity as the detection results of the plurality of mixed color patches and the detection result of the black monotone patch.

13. The image forming apparatus according to claim 6, further comprising a management unit configured to store and update a change in a state of the image forming apparatus in each of the first image forming mode and the second image forming mode,
wherein the determining unit performs the determination based on the change in the state of the image forming apparatus in each of the first image forming mode and the second image forming mode stored by the management unit.

14. The image forming apparatus according to claim 13, further comprising a part replacement detector configured to detect a part replacement,
wherein, in a case where the part replacement is not detected by the part replacement detector, the determining unit is configured to determine whether or not the first image forming condition or the second image forming condition is set, depending on whether or not the change in the state exceeds a threshold, and
wherein, in a case where the part replacement is detected by the part replacement detector, the determining unit is configured to determine that the first image forming condition or the second image forming condition is set, regardless of the change in the state of the image forming apparatus stored by the management unit.

* * * * *